(12) United States Patent
Shibata et al.

(10) Patent No.: US 12,518,787 B2
(45) Date of Patent: *Jan. 6, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Natsumi Shibata, Tokyo (JP); Naoya Fukumoto, Tokyo (JP); Ayano Asano, Tokyo (JP); Tsuyoshi Kato, Tokyo (JP); Takuma Kuroda, Tokyo (JP); Daisuke Yagyu, Tokyo (JP); Chizuru Kasahara, Tokyo (JP); Yutaka Tanji, Tokyo (JP)

(73) Assignee: Resonac Corporation, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 18/285,527

(22) PCT Filed: Apr. 6, 2022

(86) PCT No.: PCT/JP2022/017159
§ 371 (c)(1),
(2) Date: Oct. 4, 2023

(87) PCT Pub. No.: WO2022/215703
PCT Pub. Date: Oct. 13, 2022

(65) Prior Publication Data
US 2024/0203453 A1 Jun. 20, 2024

(30) Foreign Application Priority Data
Apr. 8, 2021 (JP) .................... 2021-065869

(51) Int. Cl.
*G11B 5/725* (2006.01)
*C08G 65/22* (2006.01)
(Continued)

(52) U.S. Cl.
CPC .......... *G11B 5/7257* (2020.08); *C08G 65/226* (2013.01); *C10M 107/38* (2013.01);
(Continued)

(58) Field of Classification Search
None
See application file for complete search history.

(56) References Cited

U.S. PATENT DOCUMENTS 8,518,564 B2    8/2013  Burns et al.
11,261,394 B2 * 3/2022  Kato .................. C10M 105/54
(Continued)

FOREIGN PATENT DOCUMENTS

JP    2010-248463 A    11/2010
JP     4632144 B2       2/2011
(Continued)

OTHER PUBLICATIONS

Guo et al., "A multidentate lubricant for use in hard disk drives at sub-nanometer thickness", Journal of Applied Physics, 2012, vol. 111, 024503-1 to 024503-7 (7 pages).
(Continued)

*Primary Examiner* — Kevin M Bernatz
(74) *Attorney, Agent, or Firm* — Sughrue Mion, PLLC

(57) ABSTRACT

The present invention provides a fluorine-containing ether compound represented by the following formula.

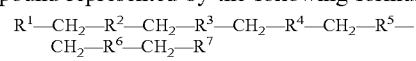

(In Formula (1), $R^2$, $R^4$, and $R^6$ are perfluoropolyether chains, $R^3$ is Formula (2), $R^5$ is Formula (3), and $R^1$ and $R^7$ are each independently a terminal group having two or three polar groups, in which individual polar groups are bound to different carbon atoms and the carbon atoms to which the polar groups are bound are bound to each other via a linking group containing a carbon atom to which no polar group is bound).

(Continued)

-continued

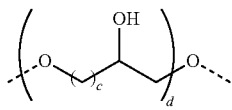
(3)

13 Claims, 1 Drawing Sheet

(51) Int. Cl.
    *C10M 107/38* (2006.01)
    *C10N 40/18* (2006.01)
    *C10N 50/00* (2006.01)
(52) U.S. Cl.
    CPC .............. *C10M 2213/0606* (2013.01); *C10N 2040/18* (2013.01); *C10N 2050/025* (2020.05)

(56) References Cited

U.S. PATENT DOCUMENTS

| | | | |
|---|---|---|---|
| 11,332,686 B2* | 5/2022 | Fukumoto | G11B 5/7257 |
| 12,264,290 B2* | 4/2025 | Shibata | C08G 65/226 |
| 2015/0235664 A1 | 8/2015 | Deng et al. | |
| 2016/0260452 A1 | 9/2016 | Pathem | |
| 2017/0260472 A1 | 9/2017 | Sagata et al. | |
| 2020/0002640 A1 | 1/2020 | Lu et al. | |
| 2023/0242829 A1* | 8/2023 | Shibata | G11B 5/725 428/835.8 |
| 2024/0043612 A1* | 2/2024 | Asano | C08G 65/007 |
| 2024/0101759 A1* | 3/2024 | Yagyu | G11B 5/725 |
| 2024/0279395 A1* | 8/2024 | Shibata | C08G 65/331 |
| 2024/0331726 A1* | 10/2024 | Kasahara | C10M 107/38 |
| 2025/0129208 A1* | 4/2025 | Tanji | C10M 107/38 |

FOREIGN PATENT DOCUMENTS

| | | | | |
|---|---|---|---|---|
| JP | 2012-7008 A | 1/2012 | | |
| JP | 2012-184339 A | 9/2012 | | |
| WO | 2013/054393 A1 | 4/2013 | | |
| WO | 2015/022871 A1 | 2/2015 | | |
| WO | 2016/084781 A1 | 6/2016 | | |
| WO | 2017/145995 A1 | 8/2017 | | |
| WO | WO-2018116742 A1 * | 6/2018 | ........... | C08G 65/331 |
| WO | WO-2019054148 A1 * | 3/2019 | ........... | C07C 255/13 |
| WO | 2021/020066 A1 | 2/2021 | | |
| WO | 2021/020076 A1 | 2/2021 | | |

OTHER PUBLICATIONS

United States Office Action dated Aug. 23, 2021 in U.S. Appl. No. 16/470,713.
Notice of Allowance dated Jan. 28, 2022 in U.S. Appl. No. 16/470,713.
International Search Report dated Feb. 27, 2018 in Application No. PCT/JP2017/042189.

* cited by examiner

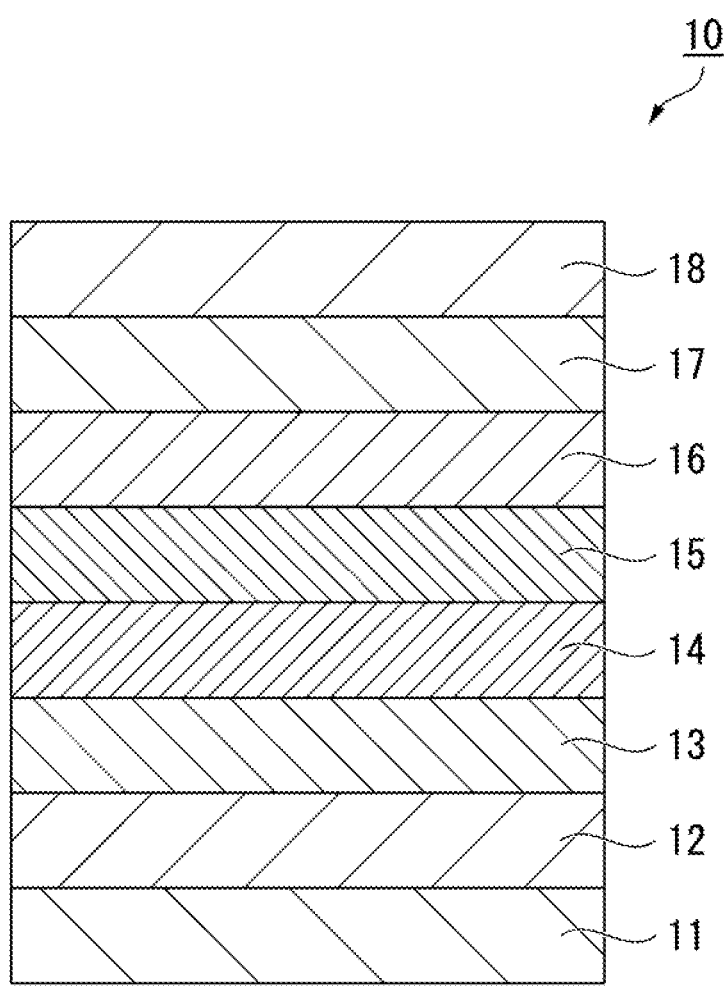

FLUORINE-CONTAINING ETHER COMPOUND, LUBRICANT FOR MAGNETIC RECORDING MEDIUM, AND MAGNETIC RECORDING MEDIUM

CROSS REFERENCE TO RELATED APPLICATIONS

This application is a National Stage of International Application No. PCT/JP2022/017159 filed Apr. 6, 2022, claiming priority based on Japanese Patent Application No. 2021-065869 filed Apr. 8, 2021, the content of which is incorporated herein by reference.

TECHNICAL FIELD

The present invention relates to a fluorine-containing ether compound, a lubricant for a magnetic recording medium, and a magnetic recording medium.

BACKGROUND ART

Development of magnetic recording media suitable for high recording densities is underway to improve the recording densities of magnetic recording/reproducing devices.

As a conventional magnetic recording medium, there is a magnetic recording medium in which a recording layer is formed on a substrate and a protective layer made of carbon or the like is formed on the recording layer. The protective layer protects information recorded in the recording layer and enhances the slidability of a magnetic head. In addition, the protective layer covers the recording layer to prevent metal contained in the recording layer from being corroded by environmental substances.

However, sufficient durability of the magnetic recording medium cannot be obtained by simply providing the protective layer on the recording layer. Therefore, a lubricant is applied to the surface of the protective layer to form a lubricating layer with a thickness of about 0.5 to 3 nm. The lubricating layer improves the durability and protective power of the protective layer and prevents contamination substances from intruding into the magnetic recording medium.

After forming the lubricating layer on the surface of the protective layer, a burnishing step may be performed to remove projections and particles present on the surface of the magnetic recording medium and improve the smoothness of the surface.

As a lubricant that is used at the time of forming a lubricating layer in a magnetic recording medium, there is, for example, a lubricant containing a fluorine-based polymer having a repeating structure containing —$CF_2$— and having a polar group such as a hydroxyl group at a terminal.

For example, Patent Document 1 discloses a magnetic disk provided with a lubricating layer containing a fluorine-containing ether compound containing three perfluoropolyether chains in its molecule and having the same structure at both terminals.

Patent Document 2 discloses a magnetic disk provided with a lubricating layer containing a fluorine-containing ether compound containing three perfluoropolyether chains in its molecule and having two different terminal structures.

In addition, Patent Document 3 discloses a magnetic disk having a lubricating layer containing a lubricant containing three perfluoropolyether chains in its molecule and having two hydroxyl groups in linking groups provided between the perfluoropolyether chains.

CITATION LIST

Patent Document

Patent Document 1

PCT International Publication No. WO2018/116742

Patent Document 2

PCT International Publication No. WO2017/145995

Patent Document 3

United States Patent Application, Publication No. 2016/0260452

SUMMARY OF INVENTION

Technical Problem

There is a demand for a further decrease in the flying height of a magnetic head in magnetic recording/reproducing devices. This requires a further decrease in the thickness of lubricating layers in magnetic recording media.

However, if the thickness of lubricating layers is reduced, the corrosion resistance of magnetic recording media may become insufficient. In particular, in a case where a tape burnishing process is performed on the surface of a magnetic recording medium after forming a lubricating layer, the corrosion resistance of the magnetic recording medium is likely to be insufficient. For this reason, there is a demand for a lubricating layer which is highly effective in suppressing corrosion of magnetic recording media.

The present invention has been made in consideration of the above circumstances, and an object of the invention is to provide a suitable fluorine-containing ether compound as a material for a lubricant for a magnetic recording medium with which a lubricating layer highly effective in suppressing corrosion of a magnetic recording medium can be formed.

In addition, another object of the present invention is to provide a lubricant for a magnetic recording medium which contains the fluorine-containing ether compound of the present invention and with which a lubricating layer highly effective in suppressing corrosion of a magnetic recording medium can be formed.

In addition, still another object of the present invention is to provide a magnetic recording medium in which a lubricating layer containing the fluorine-containing ether compound of the present invention is provided and which has an excellent corrosion resistance.

Solution to Problem

That is, the present invention relates to the following features.

A first aspect of the present invention provides the following fluorine-containing ether compound.

[1] A fluorine-containing ether compound represented by Formula (1) below.

$$R^1—CH_2—R^2—CH_2—R^3—CH_2—R^4—CH_2—R^5—CH_2—R^6—CH_2—R^7 \quad (1)$$

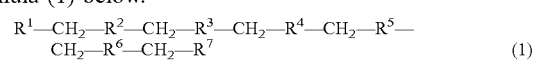

(In Formula (1), $R^2$, $R^4$, and $R^6$ are the same or different perfluoropolyether chains, $R^3$ is a linking group represented by Formula (2) below, $R^5$ is a linking group represented by Formula (3) below, and $R^1$ and $R^7$ are each independently a terminal group having two or three polar groups, in which individual polar groups are bound to different carbon atoms and the carbon atoms to which the polar groups are bound are bound to each other via a linking group containing a carbon atom to which no polar group is bound.)

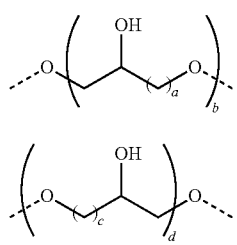

(2)

(3)

(In Formula (2), a is an integer of 1 to 3 and b is an integer of 1 to 2, and in Formula (3), c is an integer of 1 to 3 and d is an integer of 1 to 2, provided that a in Formula (2) and c in Formula (3) are not 1 at the same time.)

The fluorine-containing ether compound of the first aspect of the present invention preferably includes features described in [2] to [8] below. It is also preferable to arbitrarily combine two or more of the features described in [2] to [8] below.

[2] The fluorine-containing ether compound according to [1], in which a in Formula (2) above is an integer of 2 to 3, and c in Formula (3) above is an integer of 2 to 3.

[3] The fluorine-containing ether compound according to [1] or [2], in which all of the polar groups in $R^1$ and $R^7$ in Formula (1) above are hydroxyl groups.

[4] The fluorine-containing ether compound according to any one of [1] to [3], in which —$R^1$ and —$R^7$ in Formula (1) above are each independently a terminal group represented by Formulae (4-1) to (4-5) below.

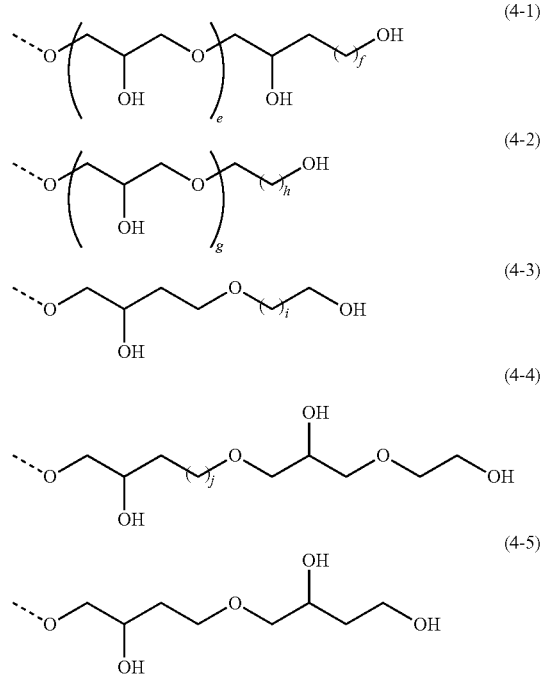

(In Formula (4-1), e is an integer of 0 to 1 and f is an integer of 1 to 4.)

(In Formula (4-2), g is an integer of 1 to 2 and h is an integer of 1 to 3.)

(In Formula (4-3), i is an integer of 1 to 3.)

(In Formula (4-4), j is an integer of 1 to 2.)

[5] The fluorine-containing ether compound according to any one of [1] to [4], in which $R^2$, $R^4$, and $R^6$ in Formula (1) above are each independently any of Formulae (5) to (9) below.

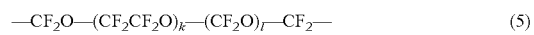

(5)

(In Formula (5), k and l indicate the average degree of polymerization and each independently represent 0.1 to 20.)

(6)

(In Formula (6), m indicates the average degree of polymerization and represents 0.1 to 20.)

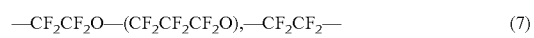

(7)

(In Formula (7), n indicates the average degree of polymerization and represents 0.1 to 20.)

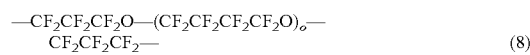

(8)

(In Formula (8), o indicates the average degree of polymerization and represents 0.1 to 10.)

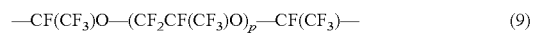

(9)

(In Formula (9), p indicates the average degree of polymerization and represents 0.1 to 20.)

[6] The fluorine-containing ether compound according to any one of [1] to [5], in which $R^1$ and $R^7$ in Formula (1) above are the same as each other.

[7] The fluorine-containing ether compound according to any one of [1] to [6], in which $R^2$ and $R^6$ in Formula (1) above are the same as each other.

[8] The fluorine-containing ether compound according to any one of [1] to [7], in which a number average molecular weight thereof is within a range of 500 to 10,000.

A second aspect of the present invention is to provide a lubricant for a magnetic recording medium below.

[9] A lubricant for a magnetic recording medium including: the fluorine-containing ether compound according to any one of [1] to [8].

A third aspect of the present invention is to provide a magnetic recording medium below.

[10] A magnetic recording medium, in which at least a magnetic layer, a protective layer, and a lubricating layer are sequentially provided on a substrate, and the lubricating layer contains the fluorine-containing ether compound according to any one of [1] to [8].

The magnetic recording medium of the third aspect of the present invention preferably includes features described in below.

[11] The magnetic recording medium according to [10], in which the average film thickness of the lubricating layer is 0.5 nm to 2.0 nm.

Advantageous Effects of Invention

The fluorine-containing ether compound of the present invention is the compound represented by Formula (1) above, and therefore can be used as a material for a lubricant for a magnetic recording medium with which a lubricating layer highly effective in suppressing corrosion of a magnetic recording medium can be formed.

Since the lubricant for a magnetic recording medium of the present invention contains the fluorine-containing ether compound of the present invention, a lubricating layer highly effective in suppressing corrosion of a magnetic recording medium can be formed.

The magnetic recording medium of the present invention is provided with the lubricating layer containing the fluorine-containing ether compound of the present invention, and therefore has an excellent corrosion resistance. For this reason, the magnetic recording medium of the present invention has excellent reliability and durability. In addition, since the magnetic recording medium of the present invention is provided with the lubricating layer highly effective in suppressing corrosion of the magnetic recording medium, the thickness of a protective layer and/or the lubricating layer can be reduced.

BRIEF DESCRIPTION OF DRAWING

The FIGURE is a schematic cross-sectional view showing an example of one embodiment of a magnetic recording medium of the present invention.

DESCRIPTION OF EMBODIMENT

The present inventors have conducted extensive studies focusing on a chain skeleton and terminal groups of a fluorine-containing ether compound to solve the above-described problems.

As a result, they have found that a fluorine-containing ether compound may be obtained which has a chain skeleton, in which three perfluoropolyether chains are bound via two specific linking groups in which one or more hydroxyl groups are bound to a chain structure including methylene groups (—$CH_2$—) and ether bonds (—O—), and in which specific terminal groups having two or three polar groups are bound to both ends of the chain skeleton via methylene groups.

In the fluorine-containing ether compound having the above-described chain skeleton, one or both of the two linking groups have a methylene chain with 2 or 3 carbon atoms between the central perfluoropolyether chain and a carbon atom to which a hydroxyl group is bound. As a result, it is inferred that a lubricating layer containing the fluorine-containing ether compound having the above-described chain skeleton would have appropriate hydrophobicity.

In addition, when the lubricating layer containing the fluorine-containing ether compound having the above-described chain skeleton is formed on a protective layer, both ends of the perfluoropolyether chain placed at the center of the chain skeleton adhere closely to the protective layer due to hydroxyl groups in the linking groups arranged between perfluoropolyether chains. For this reason, a lubricant containing the fluorine-containing ether compound having the above-described chain skeleton is likely to wet and spread on the protective layer, can uniformly adhere closely to the protective layer, and can form a lubricating layer with a high coating rate and favorable adhesion properties compared to a case where a lubricant contains a fluorine-containing ether compound having one or two perfluoropolyether chains and having the same number of carbon atoms as the above-described chain skeleton.

Moreover, at both ends of the above-described chain skeleton, terminal groups each independently having two or three polar groups are arranged, in which individual polar groups are bound to different carbon atoms and the carbon atoms to which the polar groups are bound are bound to each other via a linking group containing a carbon atom to which no polar group is bound. The two or three polar groups in these terminal groups can be oriented so as to adhere closely to the protective layer, unlike the terminal groups in which carbon atoms to which polar groups are bound are bound to each other. For this reason, for example, it is possible to form a lubricating layer with a higher coating rate and more favorable adhesion properties than a lubricating layer containing a fluorine-containing ether compound having terminal groups in which carbon atoms to which polar groups are bound are bound to each other. Furthermore, since the terminal groups have a linking group containing a carbon atom to which no polar group is bound, the hydrophobicity becomes more favorable than that of the lubricating layer containing a fluorine-containing ether compound having terminal groups in which carbon atoms to which polar groups are bound are bound to each other.

In this manner, the lubricating layer containing the fluorine-containing ether compound in which the above-described specific terminal groups are bound to both ends of the above-described chain skeleton has appropriate hydrophobicity and favorable adhesion properties with respect to the protective layer. For this reason, it is inferred that the above-described lubricating layer would be highly effective in suppressing corrosion of a magnetic recording medium.

The present inventors have conducted further studies to confirm that the lubricating layer containing the above-described fluorine-containing ether compound is formed on the protective layer and is highly effective in suppressing corrosion of a magnetic recording medium, thus leading to realization of the present invention.

Hereinafter, preferable examples of a fluorine-containing ether compound, a lubricant for a magnetic recording medium (hereinafter, abbreviated as a "lubricant" in some cases), and a magnetic recording medium of the present invention will be described in detail. The present invention is not limited to only the embodiment shown below.

Numbers, amounts, positions, ratios, materials, configurations, and the like in the present invention can be added, omitted, replaced, or modified within a scope not departing from the gist of the present invention.

[Fluorine-Containing Ether Compound]

A fluorine-containing ether compound of the present embodiment is represented by Formula (1) below.

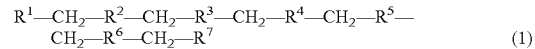

(In Formula (1), $R^2$, $R^4$, and $R^6$ are the same or different perfluoropolyether chains, $R^3$ is a linking group represented by Formula (2) below, $R^5$ is a linking group represented by Formula (3) below, and $R^1$ and $R^7$ are each independently a terminal group having two or three polar groups, in which individual polar groups are bound to different carbon atoms and the carbon atoms to which the polar groups are bound are bound to each other via a linking group containing a carbon atom to which no polar group is bound.)

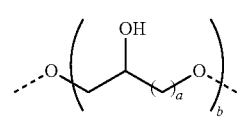
(2)

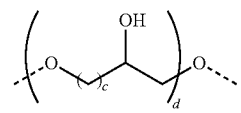
(3)

(In Formula (2), a is an integer of 1 to 3 and b is an integer of 1 to 2, and in Formula (3), c is an integer of 1 to 3 and d is an integer of 1 to 2, provided that a in Formula (2) and c in Formula (3) are not 1 at the same time.)

($R^1$ and $R^7$)

$R^1$ and $R^7$ in the fluorine-containing ether compound represented by Formula (1) above are terminal groups each independently containing two or three polar groups, in which individual polar groups are bound to different carbon atoms and the carbon atoms to which the polar groups are bound are bound to each other via a linking group containing a carbon atom to which no polar group is bound.

In the fluorine-containing ether compound represented by Formula (1), $R^1$ and $R^7$ each independently have two or three polar groups. For this reason, in a case where a lubricating layer is formed on a protective layer using a lubricant containing this fluorine-containing ether compound, a suitable interaction is generated between the lubricating layer and the protective layer.

Examples of polar groups include a hydroxyl group (—OH), an amino group (—$NH_2$), a carboxy group (—COOH), an aldehyde group (—COH), a carbonyl group (—CO—), and a sulfo group (—$SO_3H$). It is preferable that $R^1$ and/or $R^7$ contain a hydroxyl group as a polar group, and it is more preferable that all of polar groups in $R^1$ and $R^7$ be hydroxyl groups. In a case of a fluorine-containing ether compound in which $R^1$ and/or $R^7$ have a hydroxyl group, when a lubricating layer is formed on a protective layer using a lubricant containing this fluorine-containing ether compound, a more suitable interaction is generated between the lubricating layer and the protective layer.

In the fluorine-containing ether compound represented by Formula (1), the total number of polar groups in $R^1$ and polar groups in $R^7$ is 4 to 6. Since the above-described total number is 4 or more, the lubricating layer containing the fluorine-containing ether compound has high adhesiveness (adhesion properties) with respect to the protective layer. In addition, since the above-described total number is 6 or less, it is possible to prevent pickup which is adhesion of the fluorine-containing ether compound to a magnetic head as foreign matter (smears) due to excessively high polarity in a magnetic recording medium having the lubricating layer containing the fluorine-containing ether compound.

The number of polar groups in $R^1$ is preferably the same as the number of polar groups in $R^7$. That is, it is preferable that $R^1$ and $R^7$ each have two polar groups or each have three polar groups. In this case, since the lubricant containing the fluorine-containing ether compound adheres closely to the protective layer with a good balance, a lubricating layer which has a high coating rate and is highly effective in suppressing corrosion of a magnetic recording medium is likely to be obtained. In particular, in a case where $R^1$ and $R^7$ each independently contain three polar groups, the polar groups contained in the fluorine-containing ether compound firmly adhere closely to the protective layer, and therefore the coating rate increases and the effect of suppressing corrosion of a magnetic recording medium increases.

Each polar group in $R^1$ and $R^7$ is bound to a different carbon atom. In $R^1$ and $R^7$, the carbon atoms to which the polar groups are bound are bound to each other via a linking group containing a carbon atom to which no polar group is bound. For this reason, the fluorine-containing ether compound represented by Formula (1) has favorable hydrophobicity compared to, for example, a compound having terminal groups in which carbon atoms to which polar groups are bound are bound to each other. As a result, it is inferred that the lubricating layer containing the fluorine-containing ether compound represented by Formula (1) can prevent water from intruding and effectively suppress corrosion of a magnetic recording medium.

In addition, in a case where the carbon atoms to which the polar groups are bound are bound to each other via a linking group containing a carbon atom to which no polar group is bound, the linking group containing a carbon atom to which no polar group is bound allows both the most terminal polar group (terminal polar group) and the polar group adjacent to the terminal polar group to be oriented so as to adhere closely to the protective layer. From this, it is inferred that, in the case where the carbon atoms to which the polar groups are bound are bound to each other via a linking group containing a carbon atom to which no polar group is bound, a lubricating layer highly effective in suppressing corrosion of a magnetic recording medium would be obtained.

On the other hand, in a case where the fluorine-containing ether compound contained in the lubricating layer has terminal groups in which a carbon atom to which the most terminal polar group (terminal polar group) is bound is bound to a carbon atom to which a polar group adjacent to the terminal polar group is bound, either the terminal polar group or the polar group adjacent to the terminal polar group is oriented in the opposite direction with respect to the protective layer. For this reason, either the terminal polar group or the polar group adjacent to the terminal polar group is less likely to adhere closely to the protective layer, resulting in poor adhesion properties between the lubricating layer and the protective layer.

In $R^1$ and $R^7$, in a case where a linking group between a carbon atom to which a terminal polar group is bound and a carbon atom to which a polar group adjacent to the terminal polar group is bound contains an oxygen atom (for example, in cases of terminal groups represented by Formulae (4-2), (4-3), and (4-4) below), the above-described linking group in $R^1$ and $R^7$ preferably has a linear structure containing 2 to 5 carbon atoms to which no polar group is bound. Even in the case where the above-described linking group contains an oxygen atom, if the linking group has a linear structure containing two or more carbon atoms to which no polar group is bound, a fluorine-containing ether compound having favorable hydrophobicity is obtained. In addition, if the above-described linking group has a linear structure containing 5 or less carbon atoms, problems are not caused in adhesion properties with respect to the protective layer due to a too hydrophobic linking group. In particular, in a case where $R^1$ and $R^7$ each independently have three polar groups, a lubricating layer having superior adhesion properties with respect to a protective layer can be formed. Accordingly, a lubricating layer containing a fluorine-containing ether compound in which the above-described linking group in $R^1$ and $R^7$ have a linear structure containing the number of carbon atoms within the above-described range can have excellent adhesion properties with respect to a protective layer and can prevent water from intruding due to appropriate hydrophobicity, thereby obtaining a high effect of suppressing corrosion of a magnetic recording medium.

In addition, in the case where the above-described linking group in $R^1$ and $R^7$ contains an oxygen atom, the above-described linking group preferably has a linear structure consisting of 3 to 9 atoms and more preferably a linear structure consisting of 3 to 6 atoms. When the number of atoms in the above-described linking group is within the above-described range, the molecular mobility is appropriate and intramolecular aggregation is less likely to occur. For this reason, a fluorine-containing ether compound with which a lubricating layer having furthermore superior adhesion properties with respect to a protective layer can be formed is obtained.

In $R^1$ and $R^7$, when a linking group between a carbon atom to which a terminal polar group is bound and a carbon atom to which a polar group adjacent to the terminal polar group is bound do not contain an oxygen atom (for example, in cases of terminal groups represented by Formulae (4-1) and (4-5) below), in any case where $R^1$ and $R^7$ each have two or three polar groups, the above-described linking group preferably has a linear structure containing 1 to 4 carbon atoms to which no polar group is bound. In a case where the above-described linking group does not contain an oxygen atom and has a linear structure containing one or more carbon atoms to which no polar group is bound, a fluorine-containing ether compound having favorable hydrophobicity is obtained. In addition, if the above-described linking group has a linear structure containing 4 or less carbon atoms, problems are not caused in adhesion properties with respect to the protective layer due to a too hydrophobic linking group. In addition, since the linking group between a carbon atom to which a terminal polar group is bound and a carbon atom to which a polar group adjacent to the terminal polar group is bound does not contain an oxygen atom, intramolecular interaction is small and intramolecular aggregation is less likely to occur. For this reason, a fluorine-containing ether compound with which a lubricating layer having furthermore superior adhesion properties with respect to a protective layer can be formed is obtained. As a result, a lubricating layer containing a fluorine-containing ether compound in which the above-described linking group in $R^1$ and $R^7$ has a linear structure containing the number of carbon atoms within the above-described range can have excellent adhesion properties with respect to a protective layer and can prevent water from intruding due to appropriate hydrophobicity, thereby obtaining a high effect of suppressing corrosion of a magnetic recording medium.

In the fluorine-containing ether compound represented by Formula (1), $R^1$ and $R^7$ may be the same as or different from each other, and are preferably the same as each other. If $R^1$ and $R^7$ are the same as each other, a fluorine-containing ether compound which is likely to wet and spread evenly on the protective layer and from which a lubricating layer having a uniform film thickness is likely to be obtained is obtained. As a result, the lubricating layer containing this fluorine-containing ether compound has a favorable coating rate, which is preferable. In addition, in the case where $R^1$ and $R^7$ are the same as each other, a fluorine-containing ether compound can be produced efficiently through fewer production steps compared to a case where $R^1$ and $R^7$ are different from each other.

In the fluorine-containing ether compound represented by Formula (1), it is preferable that $—R^1$ and $—R^7$ each independently be a terminal group represented by any of Formulae (4-1) to (4-5) below. In a case where $—R^1$ and $—R^7$ are terminal groups represented by any of Formulae (4-1) to (4-5), $—R^1$ and $—R^7$ each contain two or three hydroxyl groups, and a linking group between a carbon atom to which a terminal hydroxyl group is bound and a carbon atom to which a hydroxyl group adjacent to the terminal hydroxyl group is bound has a linear structure with an appropriate number of carbon atoms. Accordingly, in the case where $—R^1$ and $—R^7$ are terminal groups represented by Formulae (4-1) to (4-5), a fluorine-containing ether compound having appropriate hydrophobicity is obtained.

Furthermore, in a case where $—R^1$ and $—R^7$ are terminal groups represented by any of Formulae (4-1), (4-2), (4-4), or (4-5) and each contain three hydroxyl groups, a linking group between a carbon atom to which a hydroxyl group arranged on the perfluoropolyether chain side is bound and a carbon atom to which a hydroxyl group adjacent to that hydroxyl group is bound also has a linear structure with an appropriate number of carbon atoms. Accordingly, a fluorine-containing ether compound is obtained with which a lubricating layer which has superior adhesion properties with respect to a protective layer, has appropriate hydrophobicity, and is highly effective in suppressing corrosion of a magnetic recording medium can be formed.

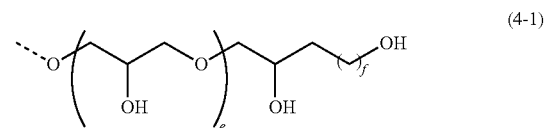

(4-1)

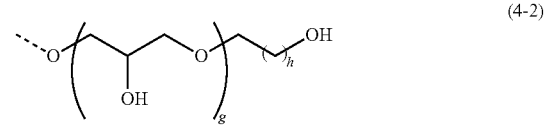

(4-2)

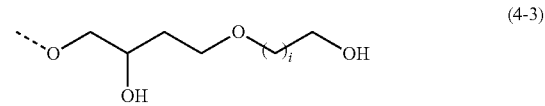

(4-3)

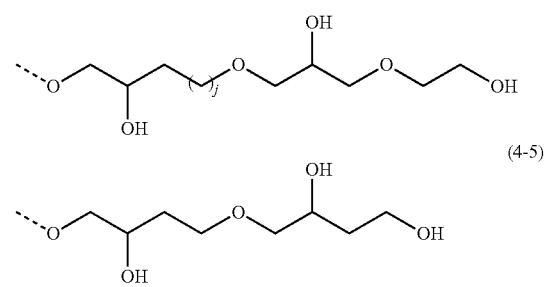

(4-4)

(4-5)

(In Formula (4-1), e is an integer of 0 to 1 and f is an integer of 1 to 4.)

(In Formula (4-2), g is an integer of 1 to 2 and h is an integer of 1 to 3.)

(In Formula (4-3), i is an integer of 1 to 3.)

(In Formula (4-4), j is an integer of 1 to 2.)

In the terminal group represented by Formula (4-1), e is an integer of 0 to 1 and f is an integer of 1 to 4. In the terminal group represented by Formula (4-1), a linking group between a carbon atom to which a terminal hydroxyl group is bound and a carbon atom to which a hydroxyl group adjacent to the terminal hydroxyl group is bound does not contain an oxygen atom. For this reason, appropriate hydrophobicity is exhibited. In addition, since f is 4 or less, problems are not caused in adhesion properties with respect to the protective layer due to a too hydrophobic linking group, thereby exhibiting an excellent effect of suppressing corrosion of a magnetic recording medium.

Furthermore, since the linking group between a carbon atom to which a terminal hydroxyl group is bound and a carbon atom to which a hydroxyl group adjacent to the terminal hydroxyl group is bound does not contain an oxygen atom, intramolecular interaction between the hydroxyl groups contained in the terminal group is small. Accordingly, intramolecular aggregation is less likely to occur, and a lubricating layer having furthermore superior adhesion properties with respect to the protective layer can be formed. In addition, in a case where e is 1, the terminal group represented by Formula (4-1) contains three hydroxyl groups, and therefore superior adhesion properties with respect to the protective layer are exhibited.

In the terminal group represented by Formula (4-2), g is an integer of 1 to 2 and h is an integer of 1 to 3. For this reason, a fluorine-containing ether compound having the terminal group represented by Formula (4-2) has favorable hydrophobicity and exhibits an excellent effect of suppressing corrosion of a magnetic recording medium. In the terminal group represented by Formula (4-2), a linking group between a carbon atom to which a terminal hydroxyl group is bound and a carbon atom to which a hydroxyl group adjacent to the terminal hydroxyl group is bound contains an oxygen atom. Since h is 1 to 3 in the terminal group represented by Formula (4-2), molecular mobility is appropriate. Accordingly, intramolecular aggregation of the hydroxyl groups contained in the terminal group is less likely to occur, and adhesion properties with respect to the protective layer are furthermore superior. In addition, in a case where g is 2, the terminal group represented by Formula (4-2) contains three hydroxyl groups, and therefore superior adhesion properties with respect to the protective layer are furthermore exhibited.

In the terminal group represented by Formula (4-3), i is an integer of 1 to 3. For this reason, a fluorine-containing ether compound containing the terminal group represented by Formula (4-3) has favorable hydrophobicity and exhibits an excellent effect of suppressing corrosion of a magnetic recording medium. In the terminal group represented by Formula (4-3), a linking group between a carbon atom to which a terminal hydroxyl group is bound and a carbon atom to which a hydroxyl group adjacent to the terminal hydroxyl group is bound contains an oxygen atom. Since i is 1 to 3 in the terminal group represented by Formula (4-3), molecular mobility is appropriate. Accordingly, intramolecular aggregation of the hydroxyl groups contained in the terminal group is less likely to occur, and adhesion properties with respect to the protective layer are furthermore superior.

In the terminal group represented by Formula (4-4), j is an integer of 1 to 2. For this reason, a fluorine-containing ether compound containing the terminal group represented by Formula (4-4) has favorable hydrophobicity and exhibits an excellent effect of suppressing corrosion of a magnetic recording medium. The terminal group represented by Formula (4-4) contains three hydroxyl groups, and therefore excellent adhesion properties with respect to the protective layer are exhibited.

In the terminal group represented by Formula (4-5), since a linking group between a carbon atom to which a terminal hydroxyl group is bound and a carbon atom to which a hydroxyl group adjacent to the terminal hydroxyl group is bound does not contain an oxygen atom, favorable hydrophobicity is exhibited. Accordingly, a lubricating layer containing a fluorine-containing ether compound having the terminal group represented by Formula (4-5) exhibits an excellent effect of suppressing corrosion of a magnetic recording medium. In addition, the terminal group represented by Formula (4-5) contains three hydroxyl groups, and therefore excellent adhesion properties with respect to the protective layer are exhibited.

($R^3$ and $R^5$)

In the fluorine-containing ether compound represented by Formula (1), $R^3$ is a linking group represented by Formula (2) below. In the linking group represented by Formula (2), the rightmost oxygen atom in the parentheses of Formula (2) is bound to a methylene group (—CH$_2$—) adjacent to $R^4$. In addition, in the fluorine-containing ether compound represented by Formula (1), $R^5$ is a linking group represented by Formula (3) below. In the linking group represented by Formula (3), the leftmost oxygen atom in the parentheses of Formula (3) is bound to a methylene group (—CH$_2$—) adjacent to $R^4$.

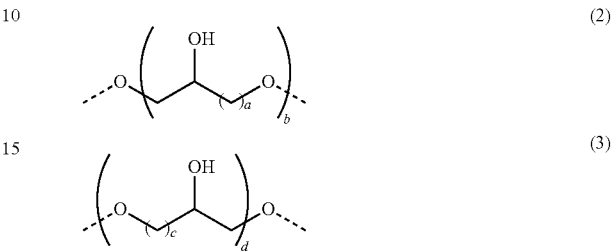

(In Formula (2), a is an integer of 1 to 3 and b is an integer of 1 to 2, and in Formula (3), c is an integer of 1 to 3 and d is an integer of 1 to 2, provided that a in Formula (2) and c in Formula (3) are not 1 at the same time.)

a in Formula (2) is an integer of 1 to 3, and c in Formula (3) is an integer of 1 to 3. a in Formula (2) and c in Formula (3) are not 1 at the same time. That is, at least one of a and c is an integer of 2 to 3. Accordingly, the fluorine-containing ether compound represented by Formula (1) has a larger number of carbon atoms contained in the linking groups represented by $R^3$ and/or $R^5$ and more favorable hydrophobicity than a compound in which a in Formula (2) representing $R^3$ is 1 and c in Formula (3) representing $R^5$ is 1.

In the fluorine-containing ether compound represented by Formula (1), it is preferable that a in Formula (2) be an integer of 2 to 3 and c in Formula (3) be an integer of 2 to 3. In this case, the fluorine-containing ether compound represented by Formula (1) has better hydrophobicity, and a lubricating layer containing this fluorine-containing ether compound exhibits a superior effect of suppressing corrosion of a magnetic recording medium.

b in Formula (2) is an integer of 1 to 2, and d in Formula (3) is an integer of 1 to 2. The hydroxyl groups in Formulae (2) and (3) improve adhesion properties of the lubricating layer containing the fluorine-containing ether compound with respect to the protective layer. b in Formula (2) and d in Formula (3) are preferably 1 to obtain an easy-to-synthesize fluorine-containing ether compound.

In the fluorine-containing ether compound represented by Formula (1), $R^3$ is the linking group represented by Formula (2) and $R^5$ is the linking group represented by Formula (3). Accordingly, oxygen atoms placed at both end portions of each of $R^3$ and $R^5$ are respectively bound to methylene groups (—CH$_2$—) placed on both sides of each of $R^3$ and $R^5$ to form ether bonds (—O—). These four ether bonds formed in this manner impart moderate flexibility to the fluorine-containing ether compound represented by Formula (1) and increase the affinity between the protective layer and the hydroxyl groups in $R^3$ and $R^5$.

($R^2$, $R^4$, and $R^6$)

$R^2$, $R^4$, and $R^6$ in the fluorine-containing ether compound represented by Formula (1) are the same or different perfluoropolyether chains (PFPE chains). Due to the PFPE chains represented by $R^2$, $R^4$, and $R^6$, in a case where a lubricant containing the fluorine-containing ether compound of the present embodiment is applied onto a protective layer to form a lubricating layer, the surface of the protective layer is covered and lubricity is imparted to the lubricating layer to reduce frictional force between a magnetic head and the protective layer. In addition, since the PFPE chains have low surface energy, water resistance is imparted to the lubricating layer containing the fluorine-containing ether compound of the present embodiment and the corrosion resistance of the magnetic recording medium on which the lubricating layer is provided is improved.

$R^2$, $R^4$, and $R^6$ are PFPE chains and can be appropriately selected depending on the performance and the like required of a lubricant containing a fluorine-containing ether compound. Examples of PFPE chains include PFPE chains such as a perfluoromethylene oxide polymer, a perfluoroethylene oxide polymer, a perfluoro-n-propylene oxide polymer, a perfluoroisopropylene oxide polymer, and copolymers thereof.

The PFPE chains may have a structure represented by Formula (Rf) below derived from a perfluoroalkylene oxide polymer or copolymer, for example.

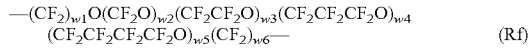

(In Formula (Rf), w2, w3, w4, and w5 indicate the average degree of polymerization and each independently represent 0 to 20, provided that all of w2, w3, w4, and w5 are not 0 at the same time, w1 and w6 are average values indicating the number of —$CF_2$— and each independently represent 1 to 3, and the arrangement sequence of repeating units in Formula (Rf) is not particularly limited.)

In Formula (Rf), w2, w3, w4, and w5 indicate the average degree of polymerization and each independently represent 0 to 20, preferably 0 to 15, more preferably 0 to 10.

In Formula (Rf), w1 and w6 are average values indicating the number of —$CF_2$— and each independently represent 1 to 3. w1 and w6 are determined according to the structure or the like of the repeating units arranged at the end portions of the chain structure in the polymer represented by Formula (Rf).

($CF_2O$), ($CF_2CF_2O$), ($CF_2CF_2CF_2O$), and ($CF_2CF_2CF_2CF_2O$) in Formula (Rf) are repeating units. The arrangement sequence of the repeating units in Formula (Rf) are not particularly limited. In addition, the number of types of repeating units in Formula (Rf) are not particularly limited.

It is preferable that $R^2$, $R^4$, and $R^6$ in Formula (1) each independently be, for example, a PFPE chain represented by Formula (Rf-1) below.

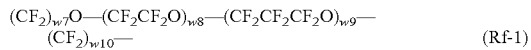

(In Formula (Rf-1), w8 and w9 indicate the average degree of polymerization and each independently represent 0.1 to 20, and w7 and w10 are average values indicating the number of —$CF_2$— and each independently represent 1 to 2.)

The arrangement sequence of ($CF_2CF_2O$) and ($CF_2CF_2CF_2O$) which are repeating units in Formula (Rf-1) is not particularly limited. Formula (Rf-1) may include any of a random copolymer, a block copolymer, and an alternating copolymer composed of the monomer units ($CF_2CF_2O$) and ($CF_2CF_2CF_2O$). In Formula (Rf-1), w8 and w9 indicate the average degree of polymerization and each independently represent 0.1 to 20, preferably 0.1 to 15, more preferably 1 to 10. In Formula (Rf-1), w7 and w10 are average values indicating the number of —$CF_2$— and each independently represent 1 to 2. w7 and w10 are determined according to the structure or the like of the repeating units arranged at the end portions of the chain structure in the polymer represented by Formula (Rf-1).

It is also preferable that $R^2$, $R^4$, and $R^6$ in Formula (1) each independently be any of Formulae (5) to (9) below. The arrangement sequence of ($CF_2CF_2O$) and ($CF_2O$) which are repeating units in Formula (5) is not particularly limited. Formula (5) may include any of a random copolymer, a block copolymer, and an alternating copolymer composed of the monomer units ($CF_2$—$CF_2$—O) and ($CF_2$—O).

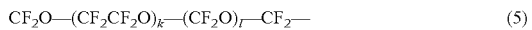

(In Formula (5), k and l indicate the average degree of polymerization and each independently represent 0.1 to 20.)

(In Formula (6), m indicates the average degree of polymerization and represents 0.1 to 20.)

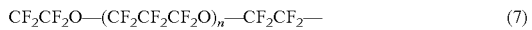

(In Formula (7), n indicates the average degree of polymerization and represents 0.1 to 20.)

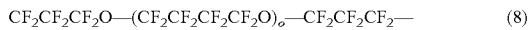

(In Formula (8), o indicates the average degree of polymerization and represents 0.1 to 10.)

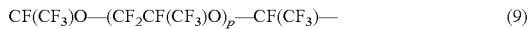

(In Formula (9), p indicates the average degree of polymerization and represents 0.1 to 20.)

k and l indicating average degrees of polymerization in Formula (5) are each 0.1 to 20, m indicating the average degree of polymerization in Formula (6) is 0.1 to 20, n indicating the average degree of polymerization in Formula (7) is 0.1 to 20, o indicating the average degree of polymerization in Formula (8) is 0.1 to 10, and p indicating the average degree of polymerization in Formula (9) is 0.1 to 20. k, l, m, n, o, and p can be arbitrarily selected within the above-described ranges. If k, l, m, n, o, and p are each 0.1 or more, a fluorine-containing ether compound with which a lubricating layer capable of furthermore suppressing corrosion of a magnetic recording medium can be obtained is obtained. In addition, if k, l, m, n, and p are each 20 or less and o is 10 or less, the viscosity of a fluorine-containing ether compound does not become too high, and a lubricant containing this fluorine-containing ether compound becomes easy to apply, which is preferable. All of k, l, m, n, o, and p indicating the average degree of polymerization are preferably 1 to 10 and more preferably 2 to 8 to obtain a fluorine-containing ether compound which is likely to wet and spread on a protective layer and from which a lubricating layer having a uniform film thickness is likely to be obtained. k, l, m, n, o, and p may be, for example, 0.5 to 9, 1 to 8, 2 to 7, 3 to 6, or 4 to 5.

In the case where $R^2$, $R^4$, and $R^6$ in Formula (1) is any of Formulae (5) to (9), a fluorine-containing ether compound is easily synthesized, which is preferable. In a case where $R^2$, $R^4$, and $R^6$ are any of Formulae (5) to (7), a raw material is readily available, which is preferable.

In addition, in the case where $R^2$, $R^4$, and $R^6$ are any of Formulae (5) to (9), the ratio of the number of oxygen atoms (the number of ether bonds (—O—)) to the number of carbon atoms in the perfluoropolyether chains is appropriate. For this reason, a fluorine-containing ether compound with moderate hardness is obtained. Accordingly, a fluorine-containing ether compound applied onto a protective layer is less likely to be aggregated on the protective layer, and a lubricating layer having an even thinner thickness at a sufficient coating rate can be formed.

In the fluorine-containing ether compound represented by Formula (1), the PFPE chains represented by $R^2$, $R^4$, and $R^6$ may all be the same as or different from each other, or may be the same only in part. In the present embodiment, the same PFPE chains include a case where PFPE chains have the same structure (repeating unit) but have different average degrees of polymerization.

In the fluorine-containing ether compound represented by Formula (1), $R^2$ and $R^6$ are preferably the same as each other to facilitate synthesis. In the case where $R^2$ is the same as $R^6$, it is more preferable that $R^3$ be the same as $R^5$ and $R^1$ be the same as $R^7$. Such a fluorine-containing ether compound can be easily and efficiently produced with a small number of production steps. In the present specification, $R^3$ and $R^5$ being the same as each other mean that atoms contained in $R^3$ and atoms contained in $R^5$ are symmetrically arranged with respect to the perfluoropolyether chain ($R^4$) placed at the center of the fluorine-containing ether compound represented by Formula (1). That is, this means that a in Formula (2) is the same as c in Formula (3) and b in Formula (2) is the same as d in Formula (3).

It is preferable that the fluorine-containing ether compound represented by Formula (1) be specifically any compound represented by Formulae (A) to (T) below.

Since ra, qb, sc, tc, rd, qe, qf, sg, tg, rh, qi, sj, tj, qk, rk, sl, tl, rl, qm, rm, qn, rn, qo, ro, qp, sp, tp, qq, sq, tq, sr, tr, rr, qs, ss, ts, st, tt, and rt in Formulae (A) to (T) are values indicating the average degree of polymerization, these are not necessarily integers.

In all the compounds represented by Formulae (A) to (T) below, $R^1$ and $R^7$ are the same as each other.

In all the compounds represented by Formulae (A) to (J) below, $R^2$, $R^4$, and $R^6$ are the same as each other. In all the compounds represented by Formulae (K) to (T) below, $R^2$ and $R^6$ are the same as each other.

In all the compounds represented by Formulae (A) to (G), (K), (L), (N) to (P), (R), and (S), $R^3$ and $R^5$ are the same as each other, a and b in Formula (2) are respectively 2 and 1, and c and d in Formula (3) are respectively 2 and 1.

In all the compounds represented by Formulae (H) to (J), (M), (Q), and (T), $R^3$ and $R^5$ are the same as each other, a and b in Formula (2) are respectively 3 and 1, and c and d in Formula (3) are respectively 3 and 1.

In the compound represented by Formula (A) below, $R^1$ and $R^7$ are terminal groups represented by Formula (4-2), g and h in Formula (4-2) are respectively 1 and 2, and $R^2$, $R^4$, and $R^6$ are PFPE chains represented by Formula (6).

In the compound represented by Formula (B) below, $R^1$ and $R^7$ are terminal groups represented by Formula (4-2), g and h in Formula (4-2) are 2, and $R^2$, $R^4$, and $R^6$ are PFPE chains represented by Formula (7).

In the compound represented by Formula (C) below, $R^1$ and $R^7$ are terminal groups represented by Formula (4-1), e and f in Formula (4-1) are respectively 0 and 1, and $R^2$, $R^4$, and $R^6$ are PFPE chains represented by Formula (5).

In the compound represented by Formula (D) below, $R^1$ and $R^7$ are terminal groups represented by Formula (4-5), and $R^2$, $R^4$, and $R^6$ are PFPE chains represented by Formula (6).

In the compound represented by Formula (E) below, $R^1$ and $R^7$ are terminal groups represented by Formula (4-2), g and h in Formula (4-2) are 1, and $R^2$, $R^4$, and $R^6$ are PFPE chains represented by Formula (7).

In the compound represented by Formula (F) below, $R^1$ and $R^7$ are terminal groups represented by Formula (4-3), i in Formula (4-3) is 1, and $R^2$, $R^4$, and $R^6$ are PFPE chains represented by Formula (7).

In the compound represented by Formula (G) below, $R^1$ and $R^7$ are terminal groups represented by Formula (4-1), e and f in Formula (4-1) are 1, and $R^2$, $R^4$, and $R^6$ are PFPE chains represented by Formula (5).

In the compound represented by Formula (H) below, $R^1$ and $R^7$ are terminal groups represented by Formula (4-1), e and f in Formula (4-1) are respectively 0 and 2, and $R^2$, $R^4$, and $R^6$ are PFPE chains represented by Formula (6).

In the compound represented by Formula (I) below, $R^1$ and $R^7$ are terminal groups represented by Formula (4-4), j in Formula (4-4) is 2, and $R^2$, $R^4$, and $R^6$ are PFPE chains represented by Formula (7).

In the compound represented by Formula (J) below, $R^1$ and $R^7$ are terminal groups represented by Formula (4-2), g and h in Formula (4-2) are respectively 2 and 1, and $R^2$, $R^4$, and $R^6$ are PFPE chains represented by Formula (5).

In the compound represented by Formula (K) below, $R^1$ and $R^7$ are terminal groups represented by Formula (4-1), e and f in Formula (4-1) are 1, $R^2$ and $R^6$ are PFPE chains represented by Formula (7), and $R^4$ is a PFPE chain represented by Formula (6).

In the compound represented by Formula (L) below, $R^1$ and $R^7$ are terminal groups represented by Formula (4-4), j in Formula (4-4) is 1, $R^2$ and $R^6$ are PFPE chains represented by Formula (5), and $R^4$ is a PFPE chain represented by Formula (6).

In the compound represented by Formula (M) below, $R^1$ and $R^7$ are terminal groups represented by Formula (4-2), g and h in Formula (4-2) are respectively 1 and 2, $R^2$ and $R^6$ are PFPE chains represented by Formula (7), and $R^4$ is a PFPE chain represented by Formula (6).

In the compound represented by Formula (N) below, $R^1$ and $R^7$ are terminal groups represented by Formula (4-2), g and h in Formula (4-2) are 2, $R^2$ and $R^6$ are PFPE chains represented by Formula (6), and $R^4$ is a PFPE chain represented by Formula (7).

In the compound represented by Formula (O) below, $R^1$ and $R^7$ are terminal groups represented by Formula (4-5), $R^2$ and $R^6$ are PFPE chains represented by Formula (6), and $R^4$ is a PFPE chain represented by Formula (7).

In the compound represented by Formula (P) below, $R^1$ and $R^7$ are terminal groups represented by Formula (4-2), g and h in Formula (4-2) are respectively 1 and 3, $R^2$ and $R^6$ are PFPE chains represented by Formula (5), and $R^4$ is a PFPE chain represented by Formula (7).

In the compound represented by Formula (Q) below, $R^1$ and $R^7$ are terminal groups represented by Formula (4-2), g and h in Formula (4-2) are 1, $R^2$ and $R^6$ are PFPE chains represented by Formula (5), and $R^4$ is a PFPE chain represented by Formula (7).

In the compound represented by Formula (R) below, $R^1$ and $R^7$ are terminal groups represented by Formula (4-2), g and h in Formula (4-2) are respectively 2 and 1, $R^2$ and $R^6$ are PFPE chains represented by Formula (6), and $R^4$ is a PFPE chain represented by Formula (5).

In the compound represented by Formula (S) below, $R^1$ and $R^7$ are terminal groups represented by Formula (4-1), e and f in Formula (4-1) are respectively 0 and 3, $R^2$ and $R^6$ are PFPE chains represented by Formula (7), and $R^4$ is a PFPE chain represented by Formula (5).

In the compound represented by Formula (T) below, $R^1$ and $R^7$ are terminal groups represented by Formula (4-1), e and f in Formula (4-1) are respectively 1 and 2, $R^2$ and $R^6$ are PFPE chains represented by Formula (6), and $R^4$ is a PFPE chain represented by Formula (5).

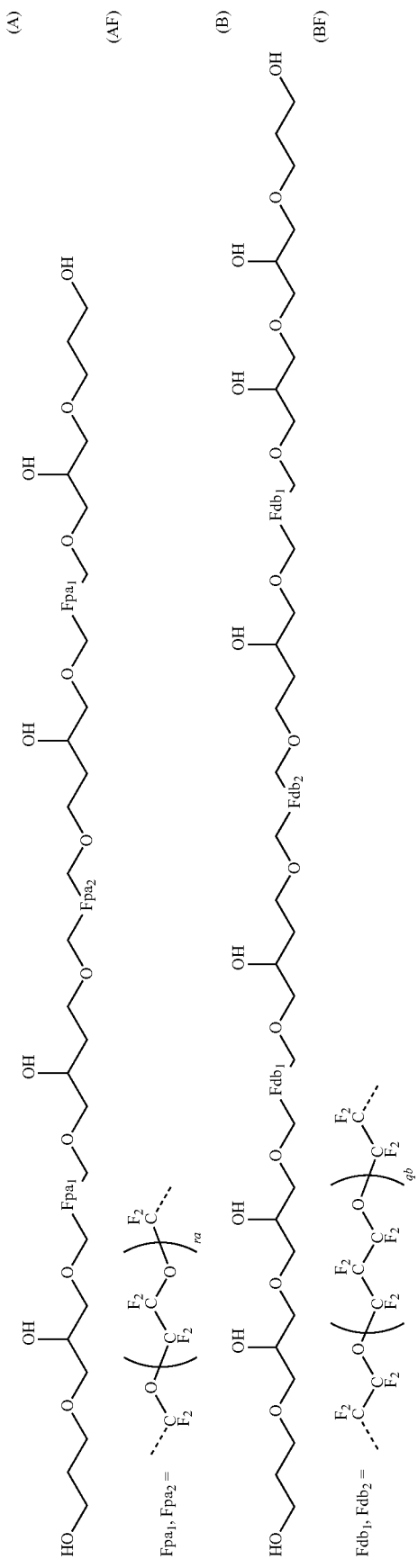

(Fpa$_1$ and Fpa$_2$ in Formula (A) are represented by Formula (AF), ra in Fpa$_1$ and Fpa$_2$ indicates the average degree of polymerization and represents 0.1 to 20, and ra in Ppa$_1$ and ra in Ppa$_2$ may be the same as or different from each other.)

(Fdb$_1$ and Fdb$_2$ in Formula (B) are represented by Formula (BF), qb in Fdb$_1$ and Fdb$_2$ indicates the average degree of polymerization and represents 0.1 to 20, and qb in Fdb$_1$ and qb in Fdb$_2$ may be the same as or different from each other.)

(C)

(CF)

(D)

(DF)

(Ffc$_1$ and Ffc$_2$ in Formula (C) are represented by Formula (CF), sc and tc in Ffc$_1$ and Ffc$_2$ indicate the average degree of polymerization and represent 0.1 to 20, and sc and tc in Ffc$_1$ and sc and tc in Ffc$_2$ may be the same as or different from each other.)

(Fpd$_1$ and Fpd$_2$ in Formula (D) are represented by Formula (DF), rd in Fpd$_1$ and Fpd$_2$ indicates the average degree of polymerization and represents 0.1 to 20, and rd in Fpd$_1$ and rd in Fpd$_2$ may be the same as or different from each other.)

(E)

(EF)

(F)

(FF)

(Fde$_1$ and Fde$_2$ in Formula (E) are represented by Formula (EF), qe in Fde$_1$ and Fde$_2$ indicates the average degree of polymerization and represents 0.1 to 20, and qe in Fde$_1$ and qe in Fde$_2$ may be the same as or different from each other.)

(Fdf$_1$ and Fdf$_2$ in Formula (F) are represented by Formula (FF), qf in Fdf$_1$ and Fdf$_2$ indicates the average degree of polymerization and represents 0.1 to 20, and qf in Fdf$_1$ and qf in Fdf$_2$ may be the same as or different from each other.)

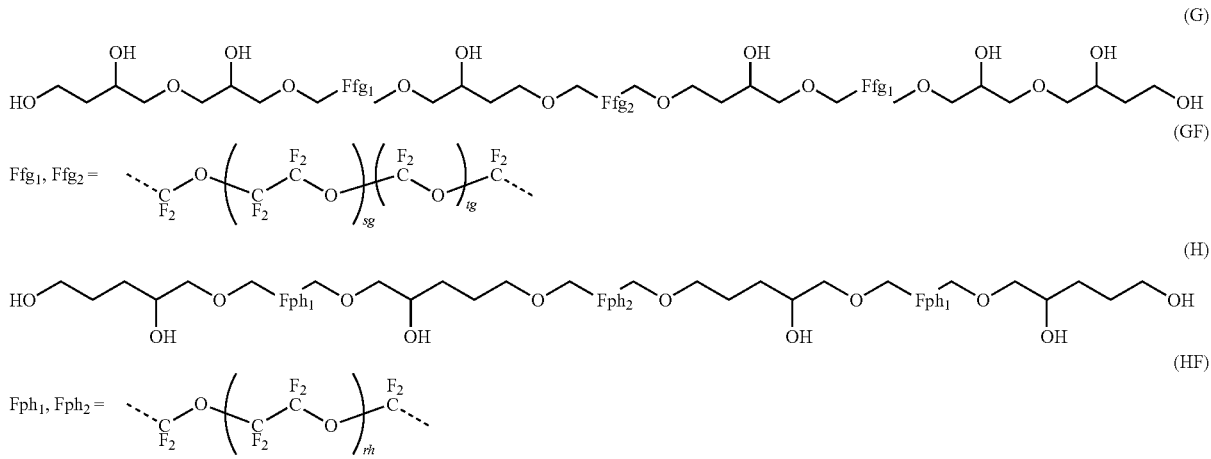

(Ffg$_1$ and Ffg$_2$ in Formula (G) are represented by Formula (GF), sg and tg in Ffg$_1$ and Ffg$_2$ indicate the average degree of polymerization and represent 0.1 to 20, and sg and tg in Ffg$_1$ and sg and tg in Ffg$_2$ may be the same as or different from each other.)

(Fph$_1$ and Fph$_2$ in Formula (H) are represented by Formula (HP), rh in Fph$_1$ and Fph$_2$ indicates the average degree of polymerization and represents 0.1 to 20, and rh in Fph$_1$ and rh in Fph$_2$ may be the same as or different from each other.)

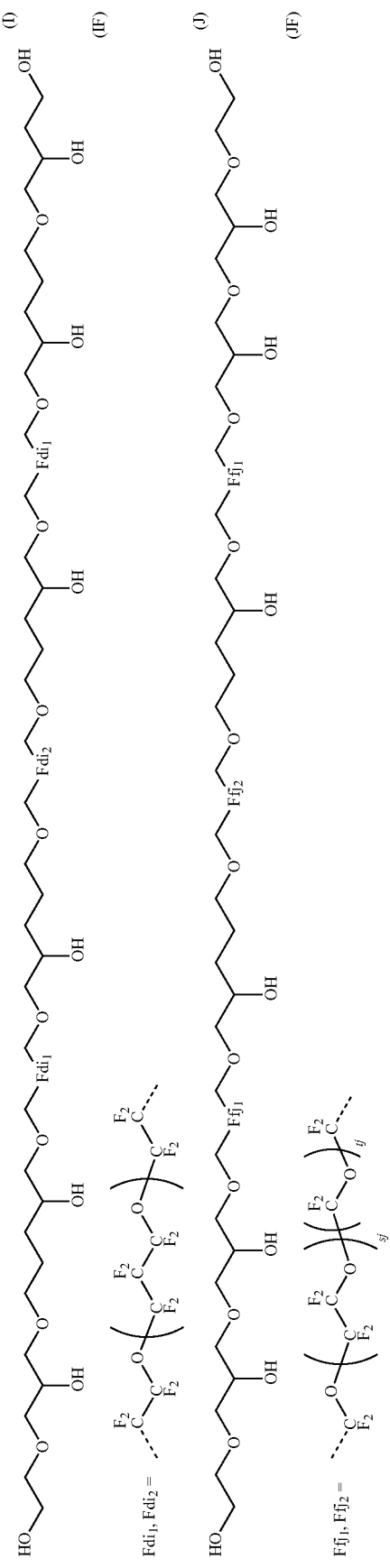

($Fdi_1$ and $Fdi_2$ in Formula (I) are represented by Formula (IF), qi in $Fdi_1$ and $Fdi_2$ indicates the average degree of polymerization and represents 0.1 to 20, and qi in $Fdi_1$ and qi in $Fdi_2$ may be the same as or different from each other.)

($Ffj_1$ and $Ffj_2$ in Formula (J) are represented by Formula (JF), sj and tj in $Ffj_1$ and $Ffj_2$ indicate the average degree of polymerization and represent 0.1 to 20, and sj and tj in $Ffj_1$ and sj and tj in $Ffj_2$ may be the same as or different from each other.)

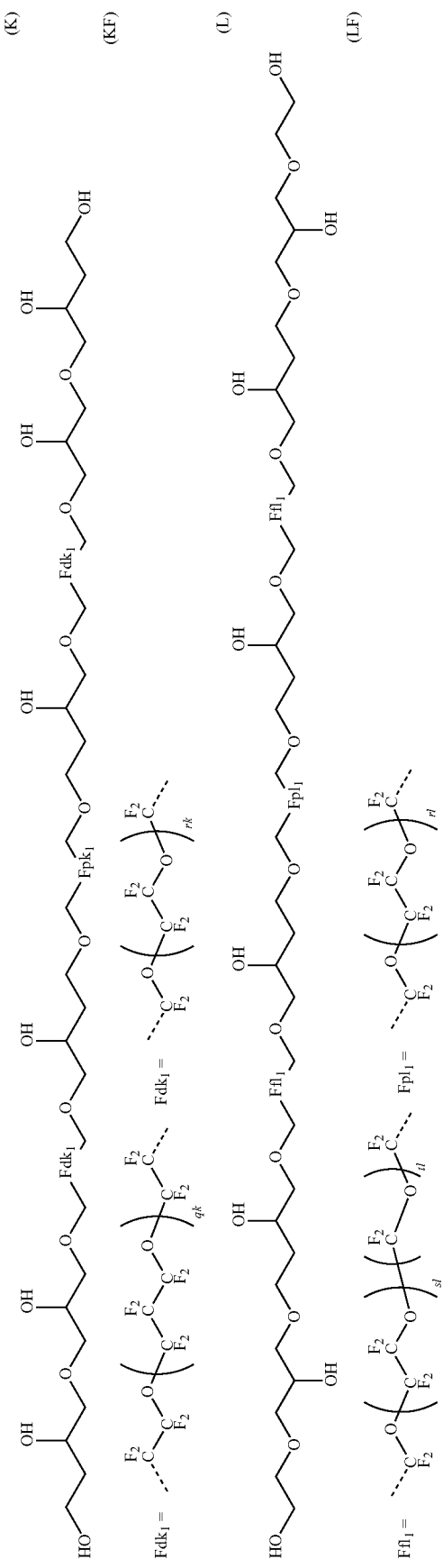

($Fdk_1$ and $Fpk_1$ in Formula (K) are represented by Formula (KF), qk in $Fdk_1$ indicates the average degree of polymerization and represents 0.1 to 20, and rk in $Fpk_1$ indicates the average degree of polymerization and represents 0.1 to 20.)

($Ffl_1$ and $Fpl_1$ in Formula (L) are represented by Formula (LF), si and tl in $Ffl_1$ indicate the average degree of polymerization and represent 0.1 to 20, and rl in $Fpl_1$ indicates the average degree of polymerization and represents 0.1 to 20.)

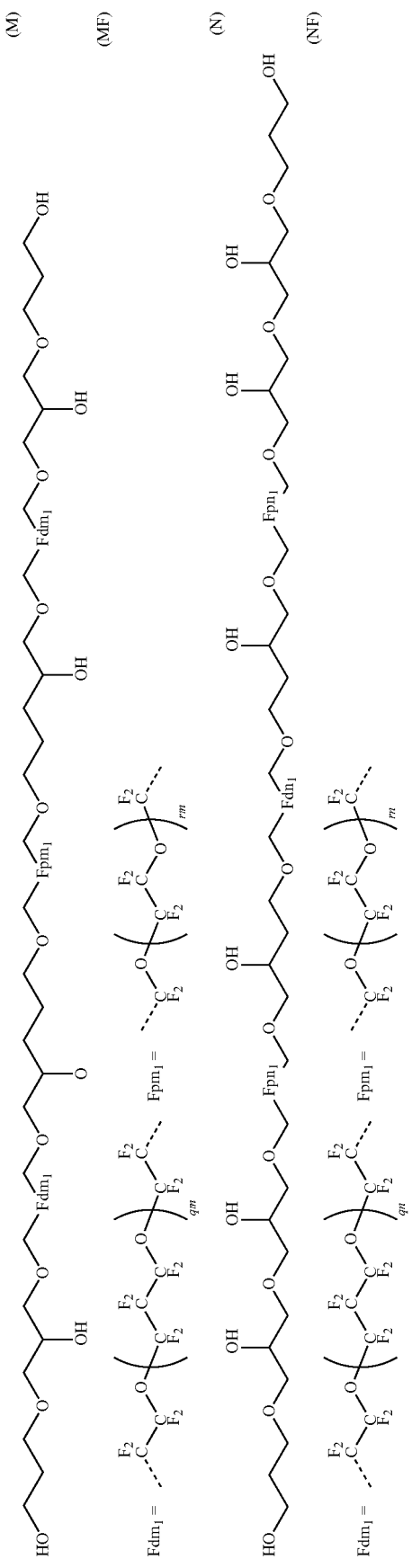

(Fdm₁ and Fpm₁ in Formula (M) are represented by Formula (MF), qm in Fdm₁ indicates the average degree of polymerization and represents 0.1 to 20, and rm in Fpm₁ indicates the average degree of polymerization and represents 0.1 to 20.)

(Fdn₁ and Fpn₁ in Formula (N) are represented by Formula (NF), qn in Fdn₁ indicates the average degree of polymerization and represents 0.1 to 20, and m in Fpn₁ indicates the average degree of polymerization and represents 0.1 to 20.)

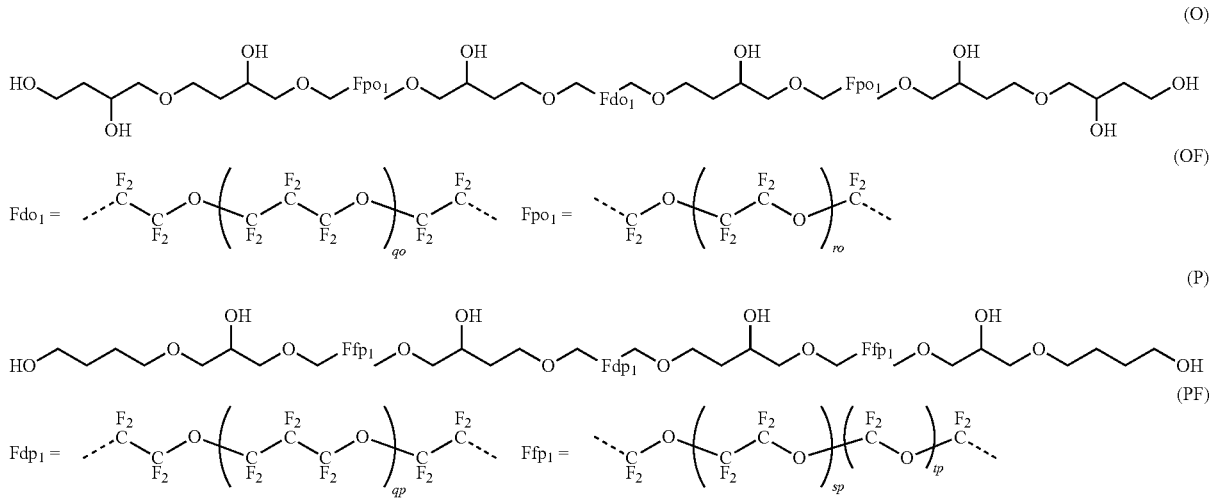

(Fdo₁ and Fpo₁ in Formula (O) are represented by Formula (OF), qo in Fdo₁ indicates the average degree of polymerization and represents 0.1 to 20, and ro in Fpo₁ indicates the average degree of polymerization and represents 0.1 to 20.)

(Fdp₁ and Ffp₁ in Formula (P) are represented by Formula (PF), qp in Fdp₁ indicates the average degree of polymerization and represents 0.1 to 20, and sp and tp in Ffp₁ indicate the average degree of polymerization and represent 0.1 to 20.)

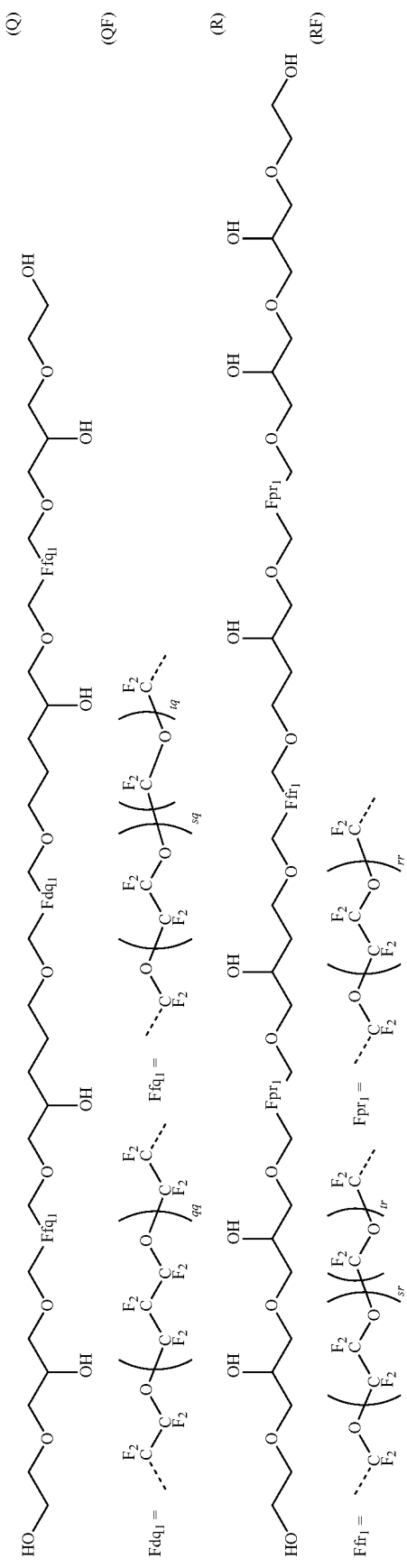

($Fdq_1$ and $Ffq_1$ in Formula (Q) are represented by Formula (QF), qq in $Fdq_1$ indicates the average degree of polymerization and represents 0.1 to 20, and sq and tq in $Ffq_1$ indicate the average degree of polymerization and represent 0.1 to 20.)

($Ffr_1$ and $Fpr_1$ in Formula (R) are represented by Formula (RF), ar and tr in $Ffr_1$ indicate the average degree of polymerization and represent 0.1 to 20, and rr in $Fpr_1$ indicates the average degree of polymerization and represents 0.1 to 20.)

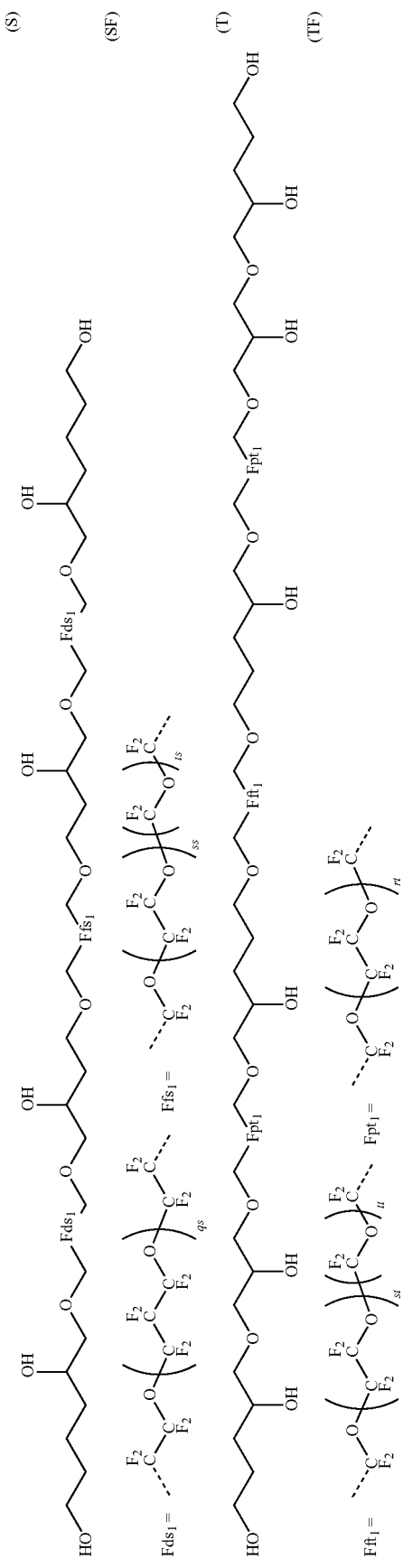

(Fds₁ and Ffs₁ in Formula (S) are represented by Formula (SF), qs in Fds₁ indicates the average degree of polymerization and represents 0.1 to 20, and ss and ts in Ffs₁ indicate the average degree of polymerization and represent 0.1 to 20.)

(Fft₁ and Fpt₁ in Formula (T) are represented by Formula (TF), st and tt in Fft₁ indicate the average degree of polymerization and represent 0.1 to 20, and rt in Fpt₁ indicates the average degree of polymerization and represents 0.1 to 20.)

When the compound represented by Formula (1) is any of compounds represented by Formulae (A) to (T), it is preferable because the procurement of raw materials is easy and a lubricating layer capable of suppressing corrosion of a magnetic recording medium can be formed even if the lubricating layer has a thin thickness.

When the compound represented by Formula (1) is any of the compounds represented by Formulae (B), (D), and (F) to (T), it is particularly preferable because it is possible to form a lubricating layer highly effective in suppressing corrosion of a magnetic recording medium.

In the fluorine-containing ether compound of the present embodiment, the number average molecular weight (Mn) of the compound is preferably within a range of 500 to 10,000, more preferably within a range of 700 to 7,000, and particularly preferably within a range of 1,000 to 5,000. If the number average molecular weight thereof is 500 or more, a lubricant containing the fluorine-containing ether compound of the present embodiment hardly evaporates, whereby the lubricant can be prevented from evaporating and transferring to a magnetic head. In addition, if the number average molecular weight is 10,000 or less, the fluorine-containing ether compound has an appropriate viscosity, and a thin lubricating layer can be easily formed by applying a lubricant containing this fluorine-containing ether compound. If the number average molecular weight is 5,000 or less, in a case where the fluorine-containing ether compound is applied to a lubricant, the viscosity of the lubricant becomes appropriate for handling, which is more preferable.

The number average molecular weight (Mn) of the fluorine-containing ether compound is a value measured by $^1$H-NMR and $^{19}$F-NMR with AVANCE III400 manufactured by Bruker BioSpin Group. In the nuclear magnetic resonance (NMR) measurement, a sample is diluted with a single or mixed solvent of hexafluorobenzene, acetone-d, tetrahydrofuran-d, and the like and used in the measurement. As the reference of the $^{19}$F-NMR chemical shift, the peak of hexafluorobenzene was set to −164.7 ppm. As the reference of the $^1$H-NMR chemical shift, the peak of acetone was set to 2.2 ppm.

"Production Method"

A method for producing the fluorine-containing ether compound of the present embodiment is not particularly limited, and the fluorine-containing ether compound can be produced using a well-known conventional production method. The fluorine-containing ether compound of the present embodiment can be produced using, for example, a production method shown below.

In the present embodiment, a case of producing a compound having a symmetrical structure around $R^4$ will be described as an example of the fluorine-containing ether compound represented by Formula (1). Specifically, a case of producing a compound in which three PFPE chains represented by $R^2$, $R^4$, and $R^6$ in Formula (1) have the same structure, $R^1$ is the same as $R^7$, and $R^3$ is the same as $R^5$ will be described as an example.

First, a fluorine compound is prepared in which hydroxymethyl groups (—CH₂OH) are placed at both terminals of a perfluoropolyether chain corresponding to $R^4$ in Formula (1). Next, the hydroxyl groups of the hydroxymethyl groups placed at both terminals of the fluorine compound are reacted with a halogen compound having an epoxy group corresponding to $R^3$ (=$R^5$) (first reaction). As a result, an intermediate compound 1 having epoxy groups corresponding to $R^3$ (=$R^5$) at both terminals of the perfluoropolyether chain corresponding to $R^4$ is obtained.

When producing the fluorine-containing ether compound of the present embodiment, examples of halogen compounds having an epoxy group used in the first reaction include epichlorohydrin, epibromohydrin, 2-(2-bromoethyl)oxirane, 2-(2-chloroethyl)oxirane, 2-(3-bromopropyl)oxirane, and 2-(3-chloropropyl)oxirane. In a case where a in Formula (2) representing $R^3$ in Formula (1) and/or c in Formula (3) representing $R^5$ are an integer of 2 to 3, as halogen compounds having an epoxy group, 2-(2-bromoethyl)oxirane, 2-(2-chloroethyl)oxirane, 2-(3-bromopropyl)oxirane, and 2-(3-chloropropyl)oxirane can be used, for example.

Subsequently, a fluorine compound is prepared in which hydroxymethyl groups (—CH₂OH) are placed at both terminals of a perfluoropolyether chain corresponding to $R^2$ (=$R^4$=$R^6$) in Formula (1). Then, a hydroxyl group of the hydroxymethyl group placed at one terminal of the fluorine compound is reacted with an epoxy compound having a group corresponding to $R^1$ (=$R^7$) in Formula (1) (second reaction). As a result, an intermediate compound 2 having the group corresponding to $R^1$ (=$R^7$) at one terminal of the perfluoropolyether chain corresponding to $R^2$ (=$R^6$) is obtained.

The epoxy compound having the group corresponding to $R^1$ (=$R^7$) may be reacted with the above-described fluorine compound after protecting the hydroxyl group with a suitable protecting group.

Epoxy compounds which are used in the second reaction when producing the fluorine-containing ether compound of the present embodiment can be synthesized, for example, by reacting alcohols having a structure corresponding to $R^1$ (or $R^7$) of the fluorine-containing ether compound to be produced with a compound having any epoxy group selected from epichlorohydrin, epibromohydrin, 2-bromoethyloxirane, and allyl glycidyl ether. Such epoxy compounds may be synthesized through a method of oxidizing an unsaturated bond, or commercially available products may be purchased and used.

Thereafter, the hydroxyl group of the hydroxymethyl group placed at one terminal of the intermediate compound 2 is reacted with the epoxy groups placed at both terminals of the intermediate compound 1 (third reaction).

By performing the above-described steps, a compound in which three PFPE chains represented by $R^2$, $R^4$, and $R^6$ in Formula (1) have the same structure, $R^1$ is the same as $R^7$, and $R^3$ is the same as $R^5$ can be produced. Here, the order of the first and second reactions may be reversed.

In addition, in a case where, for example, a compound in which $R^2$, $R^4$, and $R^6$ are the same as each other, $R^3$ is the same as $R^5$, and $R^1$ is different from $R^7$ is produced as the fluorine-containing ether compound represented by Formula (1), the production method shown below can be used.

That is, in the above-described second reaction, an intermediate compound 2a having a group corresponding to $R^1$ and an intermediate compound 2b having a group corresponding to $R^7$ are synthesized. Thereafter, in the above-described third reaction, the compound can be produced through a method in which the intermediate compound 2a and the intermediate compound 2b are sequentially reacted with the epoxy group corresponding to $R^3$ ($=R^5$) placed at each terminal of the intermediate compound 1.

In addition, in a case where, for example, a compound in which $R^2$, $R^4$, and $R^6$ are the same as each other, $R^1$ is the same as $R^7$, and $R^3$ is different from $R^5$ is produced as the fluorine-containing ether compound represented by Formula (1), the production method shown below can be used.

That is, the halogen compound having the epoxy group corresponding to $R^3$ and the halogen compound having the epoxy group corresponding to $R^5$ are sequentially reacted with the hydroxyl group of the hydroxymethyl group placed at each terminal of the fluorine compound in the above-described first reaction. As a result, an intermediate compound 1a having the epoxy group corresponding to $R^3$ at one end of the perfluoropolyether chain corresponding to $R^4$ and the epoxy group corresponding to $R^5$ at the other end is obtained. Thereafter, in the third reaction described above, the compound can be produced through a method in which the intermediate compound 1a is used instead of the intermediate compound 1.

In addition, in a case of producing, for example, a compound, in which $R^1$ is the same as $R^7$, $R^3$ is the same as $R^5$, and two PFPE chains represented by $R^2$ and $R^6$ are different from a PFPE chain represented by $R^4$, as the fluorine-containing ether compound represented by Formula (1), the compound can be produced through the production method shown below.

That is, the compound can be produced through the same method as described above except that fluorine compounds having different PFPE chains are used in the first reaction and the second reaction described above.

In addition, in a case of producing, for example, a compound, in which $R^1$ is the same as or different from $R^7$, $R^3$ is the same as $R^5$, and PFPE chains represented by $R^2$, $R^4$, and $R^6$ are different from each other, as the fluorine-containing ether compound represented by Formula (1), the compound can be produced through the production method shown below.

That is, in the above-described second reaction, two types of fluorine compounds having a different type of PFPE chain as that of the fluorine compound used in the first reaction are used as fluorine compounds. Thus, in the second reaction, an intermediate compound 2c having a group corresponding to $R^1$ at one terminal of the perfluoropolyether chain corresponding to $R^2$ and an intermediate compound 2d having a group corresponding to $R^7$ at one terminal of the perfluoropolyether chain corresponding to $R^6$ are synthesized. Thereafter, in the above-described third reaction, the compound can be produced through a method in which the intermediate compound 2c and the intermediate compound 2d are sequentially reacted with the epoxy group corresponding to $R^3$ ($=R^5$) placed at each terminal of the intermediate compound 1.

Here, the function of a lubricating layer formed on a protective layer using a lubricant containing the fluorine-containing ether compound of the present embodiment will be described.

Examples of the cause of corrosion of a magnetic recording medium include ionic contamination substances present on the surface of the magnetic recording medium. Most of the ionic contamination substances adhere to the magnetic recording medium from outside during the production process of the magnetic recording medium. The ionic contamination substances may also be generated when environmental substances that have intruded into a hard disk drive (magnetic recording/reproducing device) adhere to the magnetic recording medium. Specifically, for example, water containing environmental substances such as ions may adhere to the surface of the magnetic recording medium when the magnetic recording medium and/or hard disk drive are held under high-temperature and high-humidity conditions. When water containing environmental substances such as ions passes through the lubricating layer formed on the surface of the magnetic recording medium, it condenses minute ionic components present under the lubricating layer to generate ionic contamination substances.

Since the fluorine-containing ether compound of the present embodiment is a compound represented by Formula (1), a lubricating layer containing this fluorine-containing ether compound has a high corrosion suppressing effect that prevents contamination substances from intruding into the magnetic recording medium. This effect is obtained by the synergistic effects that the lubricating layer containing the fluorine-containing ether compound of the present embodiment has functions of <1> to <5> described below, and therefore it has excellent adhesion properties with respect to a protective layer, has appropriate hydrophobicity, and is likely to be formed on the protective layer in a uniform coating state.

<1> The above-described lubricating layer adheres closely to a protective layer due to a suitable interaction generated between the protective layer and the lubricating layer due to one or more hydroxyl groups (—OH) in each of $R^3$ and $R^5$ in the compound represented by Formula (1) and two or three polar groups each contained in $R^1$ and $R^7$. For this reason, the above-described lubricating layer can prevent contamination substances from intruding into the magnetic recording medium and suppress corrosion of the magnetic recording medium.

<2> In the fluorine-containing ether compound represented by Formula (1), three perfluoropolyether chains ($R^2$, $R^4$, and $R^6$) are each positioned between $R^1$ and $R^3$, between $R^3$ and $R^5$, and between $R^5$ and $R^7$.

For this reason, the distance between a polar group in $R^1$ and a hydroxyl group in $R^3$, the distance between hydroxyl groups in $R^3$ and $R^5$, the distance between a hydroxyl group in $R^5$ and a polar group in $R^7$ are all appropriate. Accordingly, both the hydroxyl groups in $R^3$ and $R^5$ and the polar groups in $R^1$ and $R^7$ are less likely to be inhibited form binding with active points on a protective layer due to the adjacent polar groups. Accordingly, both the hydroxyl groups in $R^3$ and $R^5$ and the polar groups in $R^1$ and $R^7$ are likely to participate in binding with the active points on the protective layer. In other words, all the polar groups in the above-described fluorine-containing ether compound are less likely to be polar groups that do not participate in binding with the active points on the protective layer. As a result, a lubricating layer containing the above-described fluorine-containing ether compound has a reduced number of polar groups that do not participate in binding with the active points on the protective layer and has good adhesion properties with respect to the protective layer.

In addition, since the distance between the hydroxyl group in $R^3$ and the hydroxyl group in $R^5$, the distance between the polar group in $R^1$ and the hydroxyl group in $R^3$, and the distance between the hydroxyl group in $R^5$ and the polar group in $R^7$ are all appropriate, intramolecular interaction between the polar groups in $R^3$, $R^5$, $R^1$, and $R^7$ is small and aggregation is less likely to occur. Accordingly, the fluorine-containing ether compound represented by Formula (1) is likely to wet and spread on the protective layer, and a lubricating layer having a uniform coating state and a high coating rate, and favorable adhesion properties, can be formed on the protective layer.

Furthermore, both end portions of each perfluoropolyether chain ($R^2$, $R^4$, and $R^6$) adhere closely to the protective layer due to the polar groups in any one of $R^3$, $R^5$, $R^1$, and $R^7$. For this reason, the fluorine-containing ether compound applied onto the protective layer is less likely to be bulky. Accordingly, the fluorine-containing ether compound represented by Formula (1) is likely to wet and spread on the protective layer, and a lubricating layer having a uniform coating state and a high coating rate, and favorable adhesion properties, can be formed on the protective layer.

<3> The fluorine-containing ether compound represented by Formula (1) has three perfluoropolyether chains ($R^2$, $R^4$, and $R^6$). The perfluoropolyether chains contained in a lubricating layer cover the surface of the protective layer and impart water resistance to the lubricating layer due to their low surface energy.

The fluorine-containing ether compound represented by Formula (1) contained in the lubricating layer undergoes heat-induced molecular motion when held under high-temperature and high-humidity conditions. Water containing environmental substances such as ions is thought to enter through gaps between molecules in molecular motion in the lubricating layer.

Since the lubricating layer containing the fluorine-containing ether compound represented by Formula (1) has appropriate water resistance and hydrophobicity, it prevents water from intruding into the magnetic recording medium through the gaps between the molecules in molecular motion in the lubricating layer and improves corrosion resistance of the magnetic recording medium.

<4> In the fluorine-containing ether compound represented by Formula (1), $R^3$ is a linking group represented by Formula (2), $R^5$ is a linking group represented by Formula (3), and a in Formula (2) and c in Formula (3) are not 1 at the same time. That is, the fluorine-containing ether compound represented by Formula (1) has a methylene chain with 2 or 3 carbon atoms between $R^4$ and a carbon atom to which hydroxyl groups in Formula (2) and/or Formula (3) are bound. Accordingly, the fluorine-containing ether compound represented by Formula (1) has a larger number of carbon atoms contained in the linking groups represented by $R^3$ and/or $R^5$ and more favorable hydrophobicity than a compound in which a in Formula (2) is 1 and c in Formula (3) is 1. As a result, a lubricating layer containing the fluorine-containing ether compound represented by Formula (1) can prevent water from intruding into the magnetic recording medium because water hardly passes therethrough.

<5> In the fluorine-containing ether compound represented by Formula (1), individual polar groups in $R^1$ and $R^7$ are bound to different carbon atoms and the carbon atoms to which the polar groups are bound are bound to each other via a linking group containing a carbon atom to which the polar group is not bound. For this reason, due to the hydrophobicity of the carbon atoms to which the polar groups contained in $R^1$ and $R^7$ are bound and the carbon atoms contained in linking groups in $R^1$ and $R^7$, a lubricating layer containing the fluorine-containing ether compound represented by Formula (1) has appropriate hydrophobicity. As a result, the lubricating layer containing the fluorine-containing ether compound represented by Formula (1) can prevent water from intruding into the magnetic recording medium because water hardly passes therethrough, and can suppress corrosion of the magnetic recording medium.

[Lubricant for Magnetic Recording Medium]

A lubricant for a magnetic recording medium of the present embodiment contains the fluorine-containing ether compound represented by Formula (1).

The lubricant of the present embodiment can be used after being mixed as necessary with a well-known material that is used as a material for lubricants within the scope not impairing the characteristics due to the incorporation of the fluorine-containing ether compound represented by Formula (1).

Specific examples of well-known materials include FOMBLIN (registered trademark) ZDIAC, FOMBLIN ZDEAL, and FOMBLIN AM-2001 (all manufactured by Solvay Solexis), and Moresco A20H (manufactured by Moresco Corporation). The number average molecular weight of the well-known material that is used by being mixed with the lubricant of the present embodiment is preferably 1,000 to 10,000.

In a case where the lubricant of the present embodiment contains a material other than the fluorine-containing ether compound represented by Formula (1), the content of the fluorine-containing ether compound represented by Formula (1) in the lubricant of the present embodiment is preferably 50 mass % or more and more preferably 70 mass % or more. The content of the fluorine-containing ether compound represented by Formula (1) may be 80 mass % or more or 90 mass % or more.

Since the lubricant of the present embodiment contains the fluorine-containing ether compound represented by Formula (1), a lubricating layer highly effective in suppressing corrosion of a magnetic recording medium can be formed. The lubricating layer consisting of the lubricant of the present embodiment is highly effective in suppressing corrosion of a magnetic recording medium, and therefore can be made thin.

[Magnetic Recording Medium]

A magnetic recording medium of the present embodiment includes at least a magnetic layer, a protective layer, and a lubricating layer sequentially provided on a substrate.

In the magnetic recording medium of the present embodiment, one or two or more underlayers can be provided as necessary between the substrate and the magnetic layer. In addition, it is also possible to provide an adhesive layer and/or a soft magnetic layer between the underlayer and the substrate.

The FIGURE is a schematic cross-sectional view showing one embodiment of a magnetic recording medium of the present invention.

A magnetic recording medium 10 of the present embodiment has a structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate or the like in which a NiP or NiP alloy film is formed on a base made of metal or alloy material such as Al or an Al alloy can be used.

In addition, as the substrate 11, a non-magnetic substrate made of a non-metal material such as glass, ceramics, silicon, silicon carbide, carbon or a resin may be used, and a non-magnetic substrate in which a NiP or NiP alloy film is formed on a base made of this non-metal material may also be used.

"Adhesive Layer"

The adhesive layer 12 prevents the progress of corrosion of the substrate 11 which may occur in a case where the substrate 11 and the soft magnetic layer 13, which is provided on the adhesive layer 12, are arranged in contact with each other.

The material of the adhesive layer 12 can be appropriately selected from, for example, Cr, a Cr alloy, Ti, a Ti alloy, CrTi, NiAl, and an AlRu alloy. The adhesive layer 12 can be formed by, for example, a sputtering method.

"Soft Magnetic Layer"

The soft magnetic layer 13 preferably has a structure in which a first soft magnetic film, an interlayer made of a Ru film, and a second soft magnetic film are sequentially laminated. That is, the soft magnetic layer 13 preferably has a structure in which the interlayer made of a Ru film is sandwiched between the two soft magnetic films, whereby the soft magnetic films on and under the interlayer are antiferromagnetically coupled (AFC).

Examples of the material of the first soft magnetic film and the second soft magnetic film include a CoZrTa alloy and a CoFe alloy.

Any of Zr, Ta and Nb is preferably added to the CoFe alloy that is used for the first soft magnetic film and the second soft magnetic film. This accelerates the amorphization of the first soft magnetic film and the second soft magnetic film, makes it possible to improve the orientation of the first underlayer (seed layer) and makes it possible to reduce the flying height of a magnetic head.

The soft magnetic layer 13 can be formed by, for example, a sputtering method.

"First Underlayer"

The first underlayer 14 is a layer for controlling the orientations and crystal sizes of the second underlayer 15 and the magnetic layer 16 that are provided on the first underlayer 14.

Examples of the first underlayer 14 include a Cr layer, a Ta layer, a Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 to be favorable. The second underlayer 15 is preferably a Ru or Ru alloy layer.

The second underlayer 15 may be a single layer or may be composed of a plurality of layers. In a case where the second underlayer 15 is composed of a plurality of layers, all of the layers may be composed of the same material or at least one layer may be composed of a different material.

The second underlayer 15 can be formed by, for example, a sputtering method.

"Magnetic Layer"

The magnetic layer 16 is made of a magnetic film in which the easy magnetization axis is directed in a perpendicular or parallel direction with respect to the substrate surface. The magnetic layer 16 is a layer containing Co and Pt and may be a layer further containing an oxide or Cr, B, Cu, Ta, Zr, or the like in order to improve SNR characteristics.

Examples of the oxide that is contained in the magnetic layer 16 include $SiO_2$, SiO, $Cr_2O_3$, CoO, $Ta_2O_3$, and $TiO_2$.

The magnetic layer 16 may be composed of a single layer or may be composed of a plurality of magnetic layers made of materials with different compositions.

For example, in a case where the magnetic layer 16 is composed of three layers of a first magnetic layer, a second magnetic layer, and a third magnetic layer sequentially laminated from below, the first magnetic layer preferably has a granular structure made of a material containing Co, Cr, and Pt and further containing an oxide. As the oxide that is contained in the first magnetic layer, for example, oxides of Cr, Si, Ta, Al, Ti, Mg, Co, or the like are preferably used. Among them, in particular, $TiO_2$, $Cr_2O_3$, $SiO_2$, and the like can be suitably used. In addition, the first magnetic layer is preferably made of a composite oxide to which two or more oxides have been added. Among them, in particular, $Cr_2O_3$—$SiO_2$, $Cr_2O_3$—$TiO_2$, $SiO_2$—$TiO_2$, and the like can be suitably used.

The first magnetic layer may contain, in addition to Co, Cr, Pt, and the oxide, one or more elements selected from B, Ta, Mo, Cu, Nd, W, Nb, Sm, Tb, Ru, and Re.

For the second magnetic layer, the same material as for the first magnetic layer can be used. The second magnetic layer preferably has a granular structure.

The third layer preferably has a non-granular structure made of a material containing Co, Cr, and Pt but containing no oxides. The third magnetic layer may contain, in addition to Co, Cr, and Pt, one or more elements selected from B, Ta, Mo, Cu, Nd, W, Nb, Sm, Tb, Ru, Re, and Mn.

In a case where the magnetic layer 16 is formed of a plurality of magnetic layers, a non-magnetic layer is preferably provided between the magnetic layers adjacent to each other. In a case where the magnetic layer 16 is made up of three layers of the first magnetic layer, the second magnetic layer and the third magnetic layer, it is preferable to provide a non-magnetic layer between the first magnetic layer and the second magnetic layer and a non-magnetic layer between the second magnetic layer and the third magnetic layer.

For the non-magnetic layer that is provided between the magnetic layers adjacent to each other in the magnetic layer 16, it is possible to suitably use, for example, Ru, a Ru alloy, a CoCr alloy, and a CoCrX1 alloy (X1 represents one or more elements selected from Pt, Ta, Zr, Re, Ru, Cu, Nb, Ni, Mn, Ge, Si, O, N, W, Mo, Ti, V, and B).

For the non-magnetic layer that is provided between the magnetic layers adjacent to each other in the magnetic layer 16, an alloy material containing an oxide, a metallic nitride or a metallic carbide is preferably used. Specifically, as the oxide, for example, $SiO_2$, $Al_2O_3$, $Ta_2O_5$, $Cr_2O_3$, MgO, $Y_2O_3$, $TiO_2$ and the like can be used. As the metallic nitride, for example, AlN, $Si_3N_4$, TaN, CrN and the like can be used. As the metallic carbide, for example, TaC, BC, SiC and the like can be used.

The non-magnetic layer can be formed by, for example, a sputtering method.

The magnetic layer 16 is preferably a magnetic layer for perpendicular magnetic recording in which the easy magnetization axis is directed in a direction perpendicular to the substrate surface in order to realize a higher recording density. The magnetic layer 16 may be a magnetic layer for in-plane magnetic recording.

The magnetic layer 16 may be formed by any well-known conventional method such as a deposition method, an ion beam sputtering method, or a magnetron sputtering method. The magnetic layer 16 is normally formed by a sputtering method.

"Protective Layer"

The protective layer 17 protects the magnetic layer 16. The protective layer 17 may be composed of a single layer or may be composed of a plurality of layers. As the material of the protective layer 17, carbon, nitrogen-containing carbon, silicon carbide, and the like can be exemplified.

As the protective layer 17, a carbon-based protective layer can be preferably used, and, in particular, an amorphous carbon protective layer is preferable. When the protective layer 17 is a carbon-based protective layer, an interaction with the hydroxyl group contained in the fluorine-containing ether compound in the lubricating layer 18 is further enhanced, which is preferable.

The adhesive force between the carbon-based protective layer and the lubricating layer 18 can be controlled by forming the carbon-based protective layer with hydrogenated carbon and/or nitrogenated carbon and adjusting the hydrogen content and/or the nitrogen content of the carbon-based protective layer. The hydrogen content in the carbon-based protective layer is preferably 3 to 20 atomic % when measured by the hydrogen forward scattering method (HFS). In addition, the nitrogen content of the carbon-based protective layer is preferably 4 to 15 atomic % when measured by X-ray photoelectron spectroscopy (XPS).

The hydrogen and/or nitrogen that are contained in the carbon-based protective layer do not need to be uniformly contained throughout the entire carbon-based protective layer. The carbon-based protective layer is suitably formed as, for example, a composition gradient layer in which nitrogen is contained in the lubricating layer 18 side of the protective layer 17 and hydrogen is contained in the magnetic layer 16 side of the protective layer 17. In this case, the adhesive force between the magnetic layer 16 and the carbon-based protective layer and the adhesive force between the lubricating layer 18 and the carbon-based protective layer further improve.

The film thickness of the protective layer 17 is preferably set to 1 nm to 7 nm. When the film thickness of the protective layer 17 is 1 nm or more, performance as the protective layer 17 can be sufficiently obtained. The film thickness of the protective layer 17 is preferably 7 nm or less from the viewpoint of reducing the thickness of the protective layer 17.

As a method for forming the protective layer 17, it is possible to use a sputtering method in which a carbon-containing target material is used, a chemical vapor deposition (CVD) method in which a hydrocarbon raw material such as ethylene or toluene is used, an ion beam deposition (IBD) method, and the like.

In the case of forming a carbon-based protective layer as the protective layer 17, the carbon-based protective layer can be formed by, for example, a DC magnetron sputtering method. Particularly, in the case of forming a carbon-based protective layer as the protective layer 17, an amorphous carbon protective layer is preferably formed by a plasma CVD method. The amorphous carbon protective layer formed by the plasma CVD method has a uniform surface with small roughness.

"Lubricating Layer"

The lubricating layer 18 prevents contamination of the magnetic recording medium 10. In addition, the lubricating layer 18 reduces frictional force of a magnetic head of a magnetic recording/reproducing device, which slides on the magnetic recording medium 10, thereby improving the durability of the magnetic recording medium 10.

The lubricating layer 18 is formed in contact with the protective layer 17 as shown in the FIGURE. The lubricating layer 18 contains the above-described fluorine-containing ether compound.

In a case where the protective layer 17, which is placed below the lubricating layer 18, is a carbon-based protective layer, particularly, the lubricating layer 18 is bound to the protective layer 17 with a high binding force. As a result, the magnetic recording medium 10 in which the surface of the protective layer 17 is coated with the lubricating layer 18 at a high coating rate in spite of a thin thickness is likely to be obtained, and contamination on the surface of the magnetic recording medium 10 can be effectively prevented.

The average film thickness of the lubricating layer 18 is preferably 0.5 nm (5 Å) to 2.0 nm (20 Å) and more preferably 0.5 nm (5 Å) to 1.0 nm (10 Å). When the average film thickness of the lubricating layer 18 is 0.5 nm or more, the lubricating layer 18 does not have an island shape or a mesh shape and is formed in a uniform film thickness. For this reason, the surface of the protective layer 17 can be coated with the lubricating layer 18 at a high coating rate. In addition, when the average film thickness of the lubricating layer 18 is set to 2.0 nm or less, it is possible to sufficiently reduce the thickness of the lubricating layer 18 and to sufficiently decrease the flying height of a magnetic head.

In a case where the surface of the protective layer 17 is not sufficiently coated with the lubricating layer 18 at a high coating rate, an environmental substance adsorbed to the surface of the magnetic recording medium 10 passes through voids in the lubricating layer 18 and intrudes below the lubricating layer 18. The environmental substance that has intruded below the lubricating layer 18 is adsorbed and bound to the protective layer 17 and generates a contamination substance. At the time of reproducing magnetic records, the generated contamination substance (aggregated component) adheres (transfers) to a magnetic head as a smear to break the magnetic head or degrade the magnetic recording/reproducing characteristics of magnetic recording/reproducing devices.

Examples of the environmental substance that generates the contamination substance include siloxane compounds (cyclic siloxane and linear siloxane), ionic impurities, hydrocarbons having a relatively high molecular weight such as octacosane, and plasticizers such as dioctyl phthalate. Examples of metal ions contained in the ionic impurities include a sodium ion and a potassium ion. Examples of inorganic ions contained in the ionic impurities include a chlorine ion, a bromine ion, a nitrate ion, a sulfate ion, and an ammonium ion. Examples of organic ions contained in the ionic impurities include an oxalate ion and a formate ion.

"Method for Forming Lubricating Layer"

Examples of methods for forming the lubricating layer 18 include a method in which a magnetic recording medium that is not yet fully manufactured and thus includes the individual layers up to the protective layer 17 formed on the substrate 11 is prepared and a solution for forming a lubricating layer is applied onto the protective layer 17 and dried.

The solution for forming a lubricating layer can be obtained by dispersing and dissolving the above-described lubricant for a magnetic recording medium of the embodiment in a solvent as necessary and adjusting the viscosity and concentration to be suitable for application methods.

Examples of solvents used for the solution for forming a lubricating layer include fluorine-based solvents such as VERTREL (registered trademark) XF (trade name, manufactured by Dupont-Mitsui Fluorochemicals Co., Ltd.).

A method for applying the solution for forming a lubricating layer is not particularly limited, and examples thereof include a spin coating method, a spraying method, a paper coating method, and a dipping method.

In a case of using a dipping method, it is possible to use, for example, a method shown below. First, the substrate 11 on which the individual layers up to the protective layer 17 have been formed is immersed in the solution for forming a lubricating layer that has been placed in an immersion vessel of a dip coater. Next, the substrate 11 is lifted from the immersion vessel at a predetermined speed. As a result, the solution for forming a lubricating layer is applied to the surface of the protective layer 17 on the substrate 11.

The use of the dipping method makes it possible to uniformly apply the solution for forming a lubricating layer to the surface of the protective layer 17 and makes it possible to form the lubricating layer 18 on the protective layer 17 in a uniform film thickness.

In the present embodiment, a burnishing (precision polishing) step is preferably performed after the lubricating layer 18 is formed on the surface of the substrate 11. By performing the burnishing step, projection defects and particles present on the surface of the substrate 11 on which the lubricating layer 18 has been formed can be removed, and the magnetic recording medium 10 with a smooth surface can be obtained. If the surface of the magnetic recording medium 10 is smooth, the spacing loss between the magnetic recording medium 10 and a magnetic head can be reduced and the signal characteristics can improve.

As the burnishing step, for example, a step of scanning burnishing tape on the surface of the substrate 11 on which the lubricating layer 18 has been formed can be performed. As the burnishing tape, one made of a resin film holding abrasive grains can be used. The grain size of the abrasive grains can be set to, for example, #6000 to #20000.

In the present embodiment, a heat treatment is preferably carried out on the substrate 11 on which the lubricating layer 18 has been formed. The heat treatment improves the adhesion properties between the lubricating layer 18 and the protective layer 17 and improves the adhesive force between the lubricating layer 18 and the protective layer 17.

The heat treatment temperature is preferably set to 100° C. to 180° C. When the heat treatment temperature is 100° C. or higher, an effect on improvement in the adhesion properties between the lubricating layer 18 and the protective layer 17 can be sufficiently obtained. In addition, when the heat treatment temperature is set to 180° C. or lower, it is possible to prevent thermal decomposition of the lubricating layer 18. The heat treatment time is preferably set to 10 to 120 minutes.

The magnetic recording medium 10 of the present embodiment includes at least the magnetic layer 16, the protective layer 17, and the lubricating layer 18 sequentially provided on the substrate 11. In the magnetic recording medium 10 of the present embodiment, the lubricating layer 18 containing the above-described fluorine-containing ether compound is formed in contact with the protective layer 17. This lubricating layer 18 is highly effective in suppressing corrosion of the magnetic recording medium 10. For this reason, the magnetic recording medium 10 of the present embodiment has less contamination substances present on the surface, an excellent corrosion resistance, and favorable reliability and durability. In addition, since the magnetic recording medium 10 of the present embodiment has the lubricating layer 18 highly effective in suppressing corrosion, the thickness of the protective layer 17 and/or the lubricating layer 18 can be reduced. In addition, in the lubricating layer 18 in the magnetic recording medium 10 of the present embodiment, foreign matter (smears) are less likely to be generated, and pickup can be suppressed.

EXAMPLES

Hereinafter, the present invention will be described more specifically with reference to examples and comparative examples. The present invention is not limited to the following examples.

Example 1

A compound represented by Formula (A) above was produced through a method shown below.
(First Reaction)
9.4 g (20 mmol) of a compound represented by $HOCH_2CF_2O(CF_2CF_2O)_rCF_2CH_2OH$ (r indicating the average degree of polymerization in the formula is 2.5) (number average molecular weight: 468, molecular weight distribution: 1.1), 1.76 g (44 mmol) of 60% sodium hydride, and 15.6 mL of N,N-dimethylformamide were added to a 200 mL eggplant flask in a nitrogen gas atmosphere and stirred until the mixture became uniform at room temperature. 6.34 g (42 mmol) of 2-(2-bromoethyl)oxirane was added to this uniform liquid and reacted by being stirred at 40° C. for 2 hours.

A reaction product obtained after the reaction was cooled to 25° C., 80 mL of water was added thereto to stop the reaction, the mixture was moved to a separatory funnel, and extraction was performed twice with 150 mL of ethyl acetate. An organic layer thereof was washed with saturated saline and dehydrated with anhydrous sodium sulfate. After the drying agent was filtered, the filtrate was concentrated, and the residue was purified by silica gel column chromatography, thereby obtaining 3.7 g (molecular weight: 608, 6.0 mmol) of a compound represented by Formula (10) below as an intermediate compound 1.

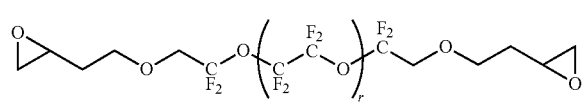

(10)

(In Formula (10), r indicating the average degree of polymerization is 2.5.)
(Second Reaction)
14.0 g of the compound represented by $HOCH_2CF_2O(CF_2CF_2O)_rCF_2CH_2OH$ (r indicating the average degree of polymerization in the formula is 2.5) (number average molecular weight: 468, molecular weight distribution: 1.1), 3.89 g (molecular weight: 216.28, 18 mmol) of a compound represented by Formula (11) below, and 28 mL of t-butanol were added to a 200 mL eggplant flask in a nitrogen gas atmosphere and stirred until the mixture became uniform at room temperature. 1.0 g (molecular weight: 112.2, 9 mmol) of potassium tert-butoxide was further added to this uniform solution and reacted by being stirred at 70° C. for 16 hours.

The compound represented by Formula (11) was synthesized by protecting one hydroxyl group of 1,3-propanediol with a tetrahydropyranyl group (THP group) and reacting epibromohydrin with the other hydroxyl group.

A reaction product obtained after the reaction was cooled to 25° C., moved to a separatory funnel containing 100 mL of water, and extracted three times with 100 mL of ethyl acetate. An organic layer thereof was washed with water and dehydrated with anhydrous sodium sulfate. After the drying agent was filtered, the filtrate was concentrated, and the residue was purified by silica gel column chromatography, thereby obtaining 8.2 g (molecular weight: 684, 12.0 mmol) of a compound represented by Formula (12) below as an intermediate compound 2.

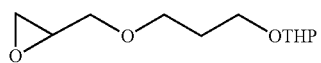

(11)

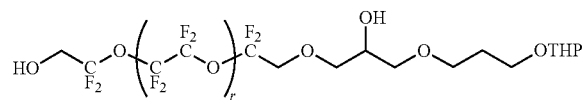

(12)

(In Formula (11), THP represents a tetrahydropyranyl group.)

(In Formula (12), r indicating the average degree of polymerization is 2.5.)

(Third Reaction)

6.8 g of the intermediate compound 2 represented by Formula (12) (r indicating the average degree of polymerization in the formula is 2.5), 0.34 g of potassium tert-butoxide, and 9.4 mL of t-butanol were added to a 200 mL eggplant flask in a nitrogen gas atmosphere and stirred until the mixture became uniform at room temperature. 1.8 g of the intermediate compound 1 represented by Formula (10) (r indicating the average degree of polymerization in the formula is 2.5) was further added to this uniform liquid and reacted by being stirred at 70° C. for 16 hours.

A reaction product obtained after the reaction was cooled to 25° C., moved to a separatory funnel containing 100 ml of water, and extracted three times with 100 mL of ethyl acetate. An organic layer thereof was washed with water and dehydrated with anhydrous sodium sulfate. After the drying agent was filtered, the filtrate was concentrated, and the residue was purified by silica gel column chromatography, thereby obtaining 3.3 g (molecular weight: 1809, 1.8 mmol) of the compound represented by Formula (A) above (Fpa$_1$ and Fpa$_2$ in Formula (A) are represented by Formula (AF), ra indicating the average degree of polymerization in Fpa$_1$ is 2.5, and ra indicating the average degree of polymerization in Fpa$_2$ is 2.5).

$^1$H-NMR and $^{19}$F-NMR measurements of the obtained compound (A) were carried out, and the structure was identified from the following results.

$^1$H-NMR (CD$_3$COCD$_3$): δ [ppm]=1.38 to 1.75 (8H), 3.37 to 4.31 (46H)

$^{19}$F-NMR (CD$_3$COCD$_3$): δ [ppm]=−78.6 (6F), −81.3 (6F), −90.0 to −88.5 (30F)

Example 2

The same operation as in Example 1 was carried out except that 13.9 g of a compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) (number average molecular weight: 693, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula was 2.5) in the first reaction, and that 20.8 g of a compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) (number average molecular weight: 693, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula was 2.5) and 6.02 g of a compound represented by Formula (13) below was used instead of the compound represented by Formula (11) in the second reaction, thereby obtaining 4.7 g (molecular weight: 2632, 1.8 mmol) of the compound represented by Formula (B) above (Fdb$_1$ and Fdb$_2$ in Formula (B) are represented by Formula (BF), qb indicating the average degree of polymerization in Fdb$_1$ is 2.5, and qb indicating the average degree of polymerization in Fdb$_2$ is 2.5).

The compound represented by Formula (13) was synthesized by the following method.

A tert-butyldimethylsilyl group (TBS group) was introduced into a primary hydroxyl group in 3-allyloxy-1,2-propanediol, and a methoxymethyl group (MOM group) was introduced into a secondary hydroxyl group in the obtained compound. After the TBS group in the obtained compound was removed, 2-(chloropropoxy)tetrahydro-2H-pyran was reacted with the generated primary hydroxyl group. The double bond of the obtained compound was oxidized. The compound represented by Formula (13) was obtained through the above-described steps.

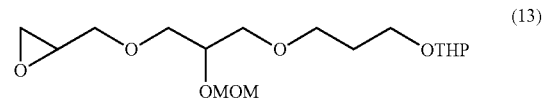

(13)

(In Formula (13), THP represents a tetrahydropyranyl group, and MOM represents a methoxymethyl group.)

$^1$H-NMR and $^{19}$F-NMR measurements of the obtained compound (B) were carried out, and the structure was identified from the following results.

$^1$H-NMR (CD$_3$COCD$_3$): δ [ppm]=1.37 to 1.81 (8H), 3.36 to 4.35 (58H)

$^{19}$F-NMR (acetone-D$_6$): δ [ppm]=−84.0 to −83.0 (30F), −86.4 (12F), −124.3 (12F), −130.0 to −129.0 (15F)

Example 3

The same operation as in Example 1 was carried out except that 12.7 g of the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) (number average molecular weight: 633, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula is 2.5) in the first reaction, and that 19.0 g of the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) (number average molecular weight: 633, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula is 2.5) and 3.10 g of a compound represented by Formula (14) below was used instead of the compound represented by Formula (11) in the second reaction, thereby obtaining 4.0 g (molecular weight: 2216, 1.8 mmol) of the compound represented by Formula (C) above (Ffc$_1$ and Ffc$_2$ in Formula (C) are represented by Formula (CF), sc and tc indicating the average degree of polymerization in Ffc$_1$ are 2.5, and sc and tc indicating the average degree of polymerization in Ffc$_2$ are 2.5).

The compound represented by Formula (14) was synthesized by introducing a tetrahydropyranyl group (THP group) into a primary hydroxyl group in 3-buten-1-ol and oxidizing the double bond of the obtained compound.

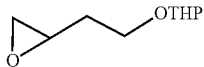

(14)

(In Formula (14), THP represents a tetrahydropyranyl group.)

$^1$H-NMR and $^{19}$F-NMR measurements of the obtained compound (C) were carried out, and the structure was identified from the following results.

$^1$H-NMR (CD$_3$COCD$_3$): δ [ppm]=1.34 to 1.67 (8H), 3.39 to 4.34 (38H)

$^{19}$F-NMR (CD$_3$COCD$_3$): δ [ppm]=−55.6 to −50.6 (15F), −77.7 (6F), −80.3 (6F), −91.0 to −88.5 (30F)

Example 4

The same operation as in Example 1 was carried out except that 4.76 g of a compound represented by Formula (15) below was used instead of the compound represented by Formula (11) in the second reaction, thereby obtaining 3.4 g (molecular weight: 1897, 1.8 mmol) of the compound represented by Formula (D) above (Fpd$_1$ and Fpd$_2$ in Formula (D) are represented by Formula (DF), rd indicating the average degree of polymerization in Fpd$_1$ is 2.5, and rd indicating the average degree of polymerization in Fpd$_2$ is 2.5).

The compound represented by Formula (15) was synthesized by the following method.

1,2,4-Butanetriol was reacted with benzaldehyde dimethylacetal to synthesize a compound in which hydroxyl groups bound to 2- and 4-position carbons of 1,2,4-butanetriol were protected. This compound was reacted with 2-bromoethyloxirane to synthesize the compound represented by Formula (15).

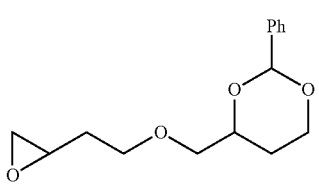

(15)

(In Formula (15), Ph represents a phenyl group.)

$^1$H-NMR and $^{19}$F-NMR measurements of the obtained compound (D) were carried out, and the structure was identified from the following results.

$^1$H-NMR (CD$_3$COCD$_3$): δ [ppm]=1.34 to 1.65 (12H), 3.42 to 4.35 (50H)

$^{19}$F-NMR (CD$_3$COCD$_3$): δ [ppm]=−78.6 (6F), −81.3 (6F), −90.0 to −88.5 (30F)

Example 5

The same operation as in Example 2 was carried out except that 3.64 g of a compound represented by Formula (16) below was used instead of the compound represented by Formula (13) in the second reaction, thereby obtaining 4.4 g (molecular weight: 2456, 1.8 mmol) of the compound represented by Formula (E) above (Fde$_1$ and Fde$_2$ in Formula (E) are represented by Formula (EF), qe indicating the average degree of polymerization in Fde$_1$ is 2.5, and qe indicating the average degree of polymerization in Fde$_2$ is 2.5).

The compound represented by Formula (16) was synthesized by oxidizing a compound obtained by protecting ethylene glycol monoallyl ether using dihydropyran.

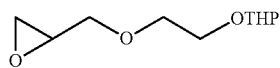

(16)

(In Formula (16), THP represents a tetrahydropyranyl group.)

$^1$H-NMR and $^{19}$F-NMR measurements of the obtained compound (E) were carried out, and the structure was identified from the following results.

$^1$H-NMR (CD$_3$COCD$_3$): δ [ppm]=1.37 to 1.64 (4H), 3.42 to 4.35 (46H) $^{19}$F-NMR (acetone-D$_6$): δ [ppm]=−84.0 to −83.0 (30F), −86.4 (12F), −124.3 (12F), −130.0 to −129.0 (15F)

Example 6

The same operation as in Example 2 was carried out except that 3.89 g of a compound represented by Formula (17) below was used instead of the compound represented by Formula (13) in the second reaction, thereby obtaining 4.5 g (molecular weight: 2484, 1.8 mmol) of the compound represented by Formula (F) above (Fdf$_1$ and Fdf$_2$ in Formula (F) are represented by Formula (FF), qf indicating the average degree of polymerization in Fdf$_1$ is 2.5, and qf indicating the average degree of polymerization in Fdf$_2$ is 2.5).

The compound represented by Formula (17) was synthesized by oxidizing the double bond of a compound obtained by reacting 3-buten-1-ol with 2-bromoethoxytetrahydropyran.

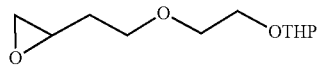

(17)

(In Formula (17), THP represents a tetrahydropyranyl group.)

$^1$H-NMR and $^{19}$F-NMR measurements of the obtained compound (F) were carried out, and the structure was identified from the following results.

$^1$H-NMR (CD$_3$COCD$_3$): δ [ppm]=1.34 to 1.59 (8H), 3.37 to 4.38 (46H)

$^{19}$F-NMR (acetone-D$_6$): δ [ppm]=−84.0 to −83.0 (30F), −86.4 (12F), −124.3 (12F), −130.0 to −129.0 (15F)

Example 7

The same operation as in Example 3 was carried out except that 4.51 g of a compound represented by Formula (18) below was used instead of the compound represented by Formula (14) in the second reaction, thereby obtaining 4.3 g (molecular weight: 2364, 1.8 mmol) of the compound represented by Formula (G) above (Ffg$_1$ and Ffg$_2$ in Formula (G) are represented by Formula (GF), sg and tg indicating the average degree of polymerization in Ffg$_1$ are 2.5, and sg and tg indicating the average degree of polymerization in Ffg$_2$ are 2.5).

The compound represented by Formula (18) was synthesized by the following method.

1,2,4-Butanetriol was reacted with benzaldehyde dimethylacetal to synthesize a compound in which hydroxyl groups bound to 2- and 4-position carbons of 1,2,4-butanetriol were protected. This compound was reacted with epibromohydrin to synthesize the compound represented by Formula (18).

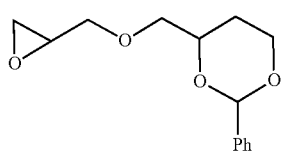

(18)

(In Formula (18), Ph represents a phenyl group.)

$^1$H-NMR and $^{19}$F-NMR measurements of the obtained compound (G) were carried out, and the structure was identified from the following results.

$^1$H-NMR (CD$_3$COCD$_3$): δ [ppm]=1.34 to 1.67 (8H), 3.38 to 4.33 (50H)

$^{19}$F-NMR (CD$_3$COCD$_3$): δ [ppm]=−55.6 to −50.6 (15F), −77.7 (6F), −80.3 (6F), −91.0 to −88.5 (30F)

Example 8

The same operation as in Example 1 was carried out except that 2-(3-bromopropyl)oxirane was used instead of 2-(2-bromoethyl)oxirane in the first reaction and 3.35 g of a compound represented by Formula (19) below was used instead of the compound represented by Formula (11) in the second reaction, thereby obtaining 3.2 g (molecular weight: 1777, 1.8 mmol) of the compound represented by Formula (H) above (Fph$_1$ and Fph$_2$ in Formula (H) are represented by Formula (HF), rh indicating the average degree of polymerization in Fph$_1$ is 2.5, and rh indicating the average degree of polymerization in Fph$_2$ is 2.5).

The compound represented by Formula (19) was synthesized by introducing a tetrahydropyranyl group (THP group) into a primary hydroxyl group in 4-penten-1-ol and oxidizing the double bond of the obtained compound.

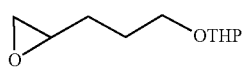

(19)

(In Formula (19), THP represents a tetrahydropyranyl group.)

$^1$H-NMR and $^{19}$F-NMR measurements of the obtained compound (H) were carried out, and the structure was identified from the following results.

$^1$H-NMR (CD$_3$COCD$_3$): δ [ppm]=1.34 to 1.65 (16H), 3.42 to 4.35 (38H)

$^{19}$F-NMR (CD$_3$COCD$_3$): δ [ppm]=−78.6 (6F), −81.3 (6F), −90.0 to −88.5 (30F)

Example 9

The same operation as in Example 2 was carried out except that 2-(3-bromopropyl)oxirane was used instead of 2-(2-bromoethyl)oxirane in the first reaction and 6.99 g of a compound represented by Formula (20) below was used instead of the compound represented by Formula (13) in the second reaction, thereby obtaining 4.8 g (molecular weight: 2688, 1.8 mmol) of the compound represented by Formula (I) above (Fdi$_1$ and Fdi$_2$ in Formula (I) are represented by Formula (IF), qi indicating the average degree of polymerization in Fdi$_1$ is 2.5, and qi indicating the average degree of polymerization in Fdi$_2$ is 2.5).

The compound represented by Formula (20) was synthesized by the following method.

A first compound was obtained by oxidizing a compound in which ethylene glycol monoallyl ether was protected using dihydropyran. The first compound was reacted with a hydroxyl group of 4-penten-1-ol to obtain a second compound. The double bond of a compound in which a secondary hydroxyl group of the second compound was protected with a THP group was oxidized. The compound represented by Formula (20) was obtained through the above-described steps.

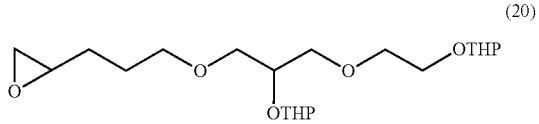

(20)

(In Formula (20), THP represents a tetrahydropyranyl group.)

$^1$H-NMR and $^{19}$F-NMR measurements of the obtained compound (I) were carried out, and the structure was identified from the following results.

$^1$H-NMR (CD$_3$COCD$_3$): δ [ppm]=1.38 to 1.58 (16H), 3.38 to 4.41 (58H)

$^{19}$F-NMR (acetone-D$_6$): δ [ppm]=−84.0 to −83.0 (30F), −86.4 (12F), −124.3 (12F), −130.0 to −129.0 (15F)

Example 10

The same operation as in Example 3 was carried out except that 2-(3-bromopropyl)oxirane was used instead of 2-(2-bromoethyl)oxirane in the first reaction and 5.77 g of a compound represented by Formula (21) below was used instead of the compound represented by Formula (14) in the second reaction, thereby obtaining 4.4 g (molecular weight: 2452, 1.8 mmol) of the compound represented by Formula (J) above (Ffj$_1$ and Ffj$_2$ in Formula (J) are represented by Formula (JF), sj and tj indicating the average degree of polymerization in Ffj$_1$ are 2.5, and sj and tj indicating the average degree of polymerization in Ffj$_2$ are 2.5).

The compound represented by Formula (21) was synthesized by the following method.

A tert-butyldimethylsilyl (TBS) group was introduced as a protective group into a primary hydroxyl group in 3-allyloxy-1,2-propanediol, and a methoxymethyl (MOM) group was introduced as a protective group into a secondary hydroxyl group in the obtained compound. After that, the TBS group was removed from the compound, and 2-bromoethoxytetrahydropyran was reacted with the generated primary hydroxyl group. The double bond of the obtained compound was oxidized. The compound represented by Formula (21) was obtained through the above-described steps.

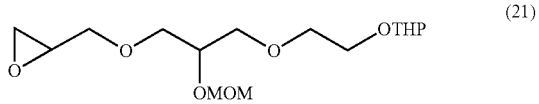

(21)

(In Formula (21), THP represents a tetrahydropyranyl group, and MOM represents a methoxymethyl group.)

$^1$H-NMR and $^{19}$F-NMR measurements of the obtained compound (J) were carried out, and the structure was identified from the following results.

$^1$H-NMR (CD$_3$COCD$_3$): δ [ppm]=1.34 to 1.66 (8H), 3.39 to 4.35 (58H)

$^{19}$F-NMR (CD$_3$COCD$_3$): δ [ppm]=−55.6 to −50.6 (15F), −77.7 (6F), −80.3 (6F), −91.0 to −88.5 (30F)

Example 11

The same operation as in Example 1 was carried out except that 20.8 g of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) (number average molecular weight: 693, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula is 2.5) and 4.51 g of the compound represented by Formula (18) above was used instead of the compound represented by Formula (11) in the second reaction, thereby obtaining 4.2 g (molecular weight: 2319, 1.8 mmol) of the compound represented by Formula (K) above (Fdk$_1$ and Fpk$_1$ in Formula (K) are represented by Formula (KF), qk indicating the average degree of polymerization in Fdk$_1$ is 2.5, and rk indicating the average degree of polymerization in Fpk$_1$ is 2.5).

$^1$H-NMR and $^{19}$F-NMR measurements of the obtained compound (K) were carried out, and the structure was identified from the following results.

$^1$H-NMR (CD$_3$COCD$_3$): δ [ppm]=1.34 to 1.63 (8H), 3.39 to 4.35 (50H)

$^{19}$F-NMR (CD$_3$COCD$_3$): δ [ppm]=−78.6 (2F), −81.3 (2F), −84.0 to −83.0 (20F), −86.4 (8F), −90.0 to −88.5 (10F), −124.3 (8F), −130.0 to −129.0 (10F)

Example 12

The same operation as in Example 1 was carried out except that the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) (number average molecular weight: 633, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula is 2.5) and 6.02 g of a compound represented by Formula (22) below was used instead of the compound represented by Formula (11) in the second reaction, thereby obtaining 4.1 g (molecular weight: 2287, 1.8 mmol) of the compound represented by Formula (L) above (Ffl$_1$ and Fpl$_1$ in Formula (L) are represented by Formula (LF), sl and tl indicating the average degree of polymerization in Ffl$_1$ are 2.5, and rl indicating the average degree of polymerization in Fpl$_1$ is 2.5).

The compound represented by Formula (22) was synthesized by the following method.

A first compound was obtained by protecting ethylene glycol monoallyl ether using dihydropyran and oxidizing the resulting compound. Next, the first compound was reacted with a hydroxyl group of 3-buten-1-ol to obtain a second compound. The compound represented by Formula (22) was obtained by protecting a secondary hydroxyl group of the obtained second compound with a MOM group and oxidizing the double bond.

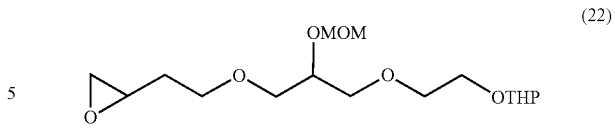

(In Formula (22), THP represents a tetrahydropyranyl group, and MOM represents a methoxymethyl group.)

$^1$H-NMR and $^{19}$F-NMR measurements of the obtained compound (L) were carried out, and the structure was identified from the following results.

$^1$H-NMR (CD$_3$COCD$_3$): δ [ppm]=1.35 to 1.62 (8H), 3.41 to 4.35 (58H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Example 13

The same operation as in Example 8 was carried out except that 20.8 g of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) (number average molecular weight: 693, molecular weight distribution: 1.1) was used instead of the compound represented by HOCH$_2$CF$_2$O(CF$_2$CF$_2$O)$_r$CF$_2$CH$_2$OH (r indicating the average degree of polymerization in the formula is 2.5) and 3.89 g of the compound represented by Formula (11) above was used instead of the compound represented by Formula (19) in the second reaction, thereby obtaining 4.1 g (molecular weight: 2287, 1.8 mmol) of the compound represented by Formula (M) above (Fdm$_1$ and Fpm$_1$ in Formula (M) are represented by Formula (MF), qm indicating the average degree of polymerization in Fdm$_1$ is 2.5, and rm indicating the average degree of polymerization in Fpm$_1$ is 2.5).

$^1$H-NMR and $^{19}$F-NMR measurements of the obtained compound (M) were carried out, and the structure was identified from the following results.

$^1$H-NMR (CD$_3$COCD$_3$): δ [ppm]=1.35 to 1.56 (12H), 3.41 to 4.37 (46H)

$^{19}$F-NMR (CD$_3$COCD$_3$): δ [ppm]=−78.6 (2F), −81.3 (2F), −84.0 to −83.0 (20F), −86.4 (8F), −90.0 to −88.5 (10F), −124.3 (8F), −130.0 to −129.0 (10F)

Example 14

The same operation as in Example 2 was carried out except that 14.0 g of the compound represented by HOCH$_2$CF$_2$O(CF$_2$CF$_2$O)$_r$CF$_2$CH$_2$OH (r indicating the average degree of polymerization in the formula is 2.5) (number average molecular weight: 468, molecular weight distribution: 1.1) was used instead of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) in the second reaction, thereby obtaining 3.9 g (molecular weight: 2182, 1.8 mmol) of the compound represented by Formula (N) above (Fdn$_1$ and Fpn$_1$ in Formula (N) are represented by Formula (NF), qn indicating the average degree of polymerization in Fdn$_1$ is 2.5, and rn indicating the average degree of polymerization in Fpn$_1$ is 2.5).

$^1$H-NMR and $^{19}$F-NMR measurements of the obtained compound (N) were carried out, and the structure was identified from the following results.

$^1$H-NMR (CD$_3$COCD$_3$): δ [ppm]=1.39 to 1.61 (8H), 3.41 to 4.45 (58H)

$^{19}$F-NMR (acetone-d$_6$): δ [ppm]=−78.6 (4F), −81.3 (4F), −84.0 to −83.0 (10F), −86.4 (4F), −90.0 to −88.5 (24F), −124.3 (4F), −130.0 to −129.0 (5F)

Example 15

The same operation as in Example 14 was carried out except that 4.76 g of the compound represented by Formula (15) above was used instead of the compound represented by Formula (13) in the second reaction, thereby obtaining 3.8 g (molecular weight: 2122, 1.8 mmol) of the compound represented by Formula (O) above (Fdo$_1$ and Fpo$_1$ in Formula (O) are represented by Formula (OF), qo indicating the average degree of polymerization in Fdo$_1$ is 2.5, and ro indicating the average degree of polymerization in Fpo$_1$ is 2.5).

$^1$H-NMR and $^{19}$F-NMR measurements of the obtained compound (O) were carried out, and the structure was identified from the following results.

$^1$H-NMR (CD$_3$COCD$_3$): δ [ppm]=1.34 to 1.58 (12H), 3.38 to 4.41 (50H)

$^{19}$F-NMR (acetone-d$_6$): δ [ppm]=−78.6 (4F), −81.3 (4F), −84.0 to −83.0 (10F), −86.4 (4F), −90.0 to −88.5 (24F), −124.3 (4F), −130.0 to −129.0 (5F)

Example 16

The same operation as in Example 2 was carried out except that a compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) (number average molecular weight: 633, molecular weight distribution: 1.1) was used instead of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) and 4.15 g of a compound represented by Formula (23) below was used instead of the compound represented by Formula (13) in the second reaction, thereby obtaining 4.3 g (molecular weight: 2392, 1.8 mmol) of the compound represented by Formula (P) above (Fdp$_1$ and Ffp$_1$ in Formula (P) are represented by Formula (PF), qp indicating the average degree of polymerization in Fdp$_1$ is 2.5, and sp and tp indicating the average degree of polymerization in Ffp$_1$ are 2.5).

The compound represented by Formula (23) was synthesized by protecting one hydroxyl group of 1,4-butanediol with a THP group and reacting epibromohydrin with the other hydroxyl group.

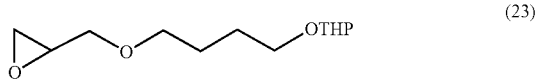

(23)

(In Formula (23), THP represents a tetrahydropyranyl group.)

$^1$H-NMR and $^{19}$F-NMR measurements of the obtained compound (P) were carried out, and the structure was identified from the following results.

$^1$H-NMR (CD$_3$COCD$_3$): δ [ppm]=1.37 to 1.61 (12H), 3.40 to 4.43 (46H)

$^{19}$F-NMR (acetone-d$_6$): δ [ppm]=−55.6 to −50.6 (10F), −77.7 (4F), −80.3 (4F), −84.0 to −83.0 (10F), −86.4 (4F), −91.0 to −88.5 (20F), −124.3 (4F), −130.0 to −129.0 (5F)

Example 17

The same operation as in Example 9 was carried out except that a compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) (number average molecular weight: 633, molecular weight distribution: 1.1) was used instead of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) and 3.64 g of the compound represented by Formula (16) above was used instead of the compound represented by Formula (20) in the second reaction, thereby obtaining 4.3 g (molecular weight: 2364, 1.8 mmol) of the compound represented by Formula (Q) above (Fdq$_1$ and Ffq$_1$ in Formula (Q) are represented by Formula (QF), qq indicating the average degree of polymerization in Fdq$_1$ is 2.5, and sq and tq indicating the average degree of polymerization in Ffq$_1$ are 2.5).

$^1$H-NMR and $^{19}$F-NMR measurements of the obtained compound (Q) were carried out, and the structure was identified from the following results.

$^1$H-NMR (CD$_3$COCD$_3$): δ [ppm]=1.36 to 1.57 (8H), 3.39 to 4.37 (46H)

$^{19}$F-NMR (acetone-d$_6$): δ [ppm]=−55.6 to −50.6 (10F), −77.7 (4F), −80.3 (4F), −84.0 to −83.0 (10F), −86.4 (4F), −91.0 to −88.5 (20F), −124.3 (4F), −130.0 to −129.0 (5F)

Example 18

The same operation as in Example 3 was carried out except that 14.0 g of the compound represented by HOCH$_2$CF$_2$O(CF$_2$CF$_2$O)$_r$CF$_2$CH$_2$OH (r indicating the average degree of polymerization in the formula is 2.5) (number average molecular weight: 468, molecular weight distribution: 1.1) was used instead of the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) and 5.77 g of the compound represented by Formula (21) above was used instead of the compound represented by Formula (14) above in the second reaction, thereby obtaining 3.8 g (molecular weight: 2094, 1.8 mmol) of the compound represented by Formula (R) above (Ffr$_1$ and Fpr$_1$ in Formula (R) are represented by Formula (RF), sr and tr indicating the average degree of polymerization in Ffr$_1$ are 2.5, and rr indicating the average degree of polymerization in Fpr$_1$ is 2.5).

$^1$H-NMR and $^{19}$F-NMR measurements of the obtained compound (R) were carried out, and the structure was identified from the following results.

$^1$H-NMR (CD$_3$COCD$_3$): δ [ppm]=1.34 to 1.59 (4H), 3.40 to 4.43 (58H)

$^{19}$F-NMR (CD$_3$COCD$_3$): δ [ppm]=−55.6 to −50.6 (5F), −77.7 (2F), −78.6 (4F), −80.3 (2F), −81.3 (4F), −90.0 to −88.5 (30F)

Example 19

The same operation as in Example 3 was carried out except that 20.8 g of the compound represented by HOCH$_2$CF$_2$CF$_2$O(CF$_2$CF$_2$CF$_2$O)$_q$CF$_2$CF$_2$CH$_2$OH (q indicating the average degree of polymerization in the formula is 2.5) (number average molecular weight: 693, molecular weight distribution: 1.1) was used instead of the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) and 3.61 g of the compound represented by Formula (24) below was used instead of the compound represented by Formula (14) above in the second reaction, thereby obtaining 4.3 g (molecular weight: 2392, 1.8 mmol) of the compound represented by Formula (S) above (Fds$_1$ and Ffs$_1$ in Formula (S) are represented by Formula (SF), qs indicating the average degree of polymerization in Fds$_1$ is 2.5, and ss and ts indicating the average degree of polymerization in Ffs$_1$ are 2.5).

The compound represented by Formula (24) was synthesized by introducing a THP group (tetrahydropyranyl group) into a primary hydroxyl group in 5-hexen-1-ol and oxidizing the double bond of the obtained compound.

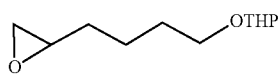

(In Formula (24), THP represents a tetrahydropyranyl group.)

$^1$H-NMR (CD$_3$COCD$_3$): δ [ppm]=1.34 to 1.57 (16H), 3.41 to 4.37 (38H)

$^{19}$F-NMR (CD$_3$COCD$_3$): δ [ppm]=−55.6 to −50.6 (5F), −77.7 (2F), −80.3 (2F), −84.0 to −83.0 (20F), −86.4 (8F), −91.0 to −88.5 (10F), −124.3 (8F), −130.0 to −129.0 (10F)

Example 20

The same operation as in Example 10 was carried out except that the compound represented by HOCH$_2$CF$_2$O (CF$_2$CF$_2$O)$_r$CF$_2$CH$_2$OH (r indicating the average degree of polymerization in the formula is 2.5) (number average molecular weight: 468, molecular weight distribution: 1.1) was used instead of the compound represented by HOCH$_2$CF$_2$O(CF$_2$CF$_2$O)$_s$(CF$_2$O)$_t$CF$_2$CH$_2$OH (s and t indicating the average degree of polymerization in the formula are 2.5) and 5.48 g of a compound represented by Formula (25) below was used instead of the compound represented by Formula (21) in the second reaction, thereby obtaining 3.76 g (molecular weight: 2090, 1.8 mmol) of the compound represented by Formula (T) above (Fft$_1$ and Fpt$_1$ in Formula (T) are represented by Formula (TF), st and tt indicating the average degree of polymerization in Fft$_1$ are 2.5, and rt indicating the average degree of polymerization in Fpt$_1$ is 2.5).

The compound represented by Formula (25) was synthesized by the following method.

A secondary hydroxyl group of a compound obtained by reacting the compound represented by Formula (19) with allyl alcohol was protected with a MOM group. The double bond of the obtained compound was oxidized to obtain the compound represented by Formula (25).

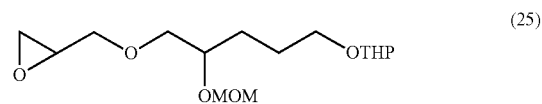

(In Formula (25), THP represents a tetrahydropyranyl group, and MOM represents a methoxymethyl group.)

$^1$H-NMR and $^{19}$F-NMR measurements of the obtained compound (T) were carried out, and the structure was identified from the following results.

$^1$H-NMR (CD$_3$COCD$_3$): δ [ppm]=1.35 to 1.60 (16H), 3.42 to 4.42 (50H)

$^{19}$F-NMR (CD$_3$COCD$_3$): δ [ppm]=−55.6 to −50.6 (5F), −77.7 (2F), −78.6 (4F), −80.3 (2F), −81.3 (4F), −90.0 to −88.5 (30F)

Comparative Example 1

A compound represented by Formula (AA) below was synthesized by the method described in Patent Document 1.

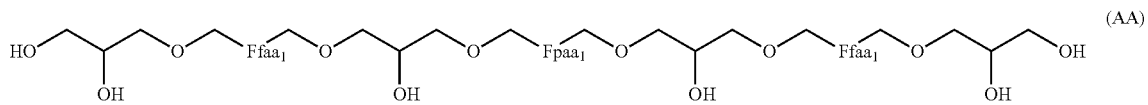

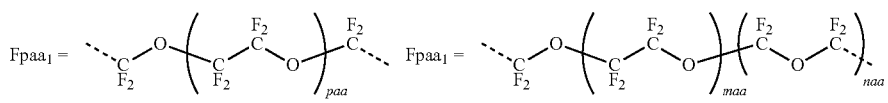

(Fpaa$_1$ and Ffaa$_1$ in Formula (AA) are represented by Formula (AAF), paa indicating the average degree of polymerization in Fpaa$_1$ is 2.5, and maa and naa indicating the average degree of polymerization in Ffaa$_1$ each independently represent 2.5.)

$^1$H-NMR and $^{19}$F-NMR measurements of the obtained compound (AA) were carried out, and the structure was identified from the following results.

$^1$H-NMR (CD$_3$COCD$_3$): δ [ppm]=3.42 to 4.28 (38H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 2

A compound represented by Formula (AB) below was synthesized by the method described in Patent Document 1.

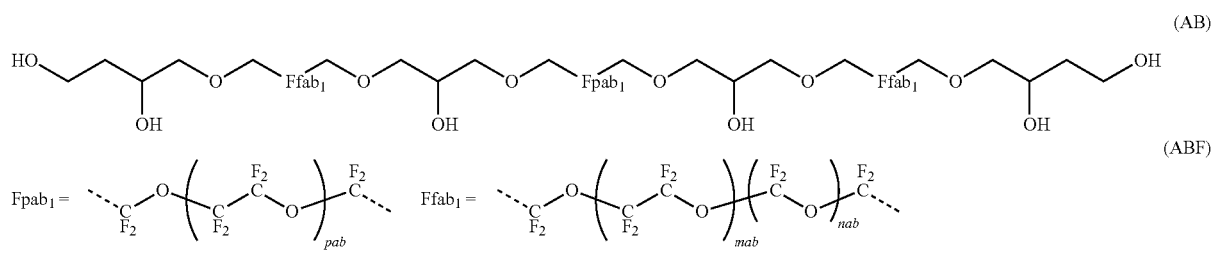

(AB)

(ABF)

(Fpab₁ and Ffab₁ in Formula (AB) are represented by Formula (ABF), pab indicating the average degree of polymerization in Fpab₁ is 2.5, and mab and nab indicating the average degree of polymerization in Ffab₁ each independently represent 2.5.)

$^1$H-NMR and $^{19}$F-NMR measurements of the obtained compound (AB) were carried out, and the structure was identified from the following results.

(Identification Data)
$^1$H-NMR (CD$_3$COCD$_3$): δ [ppm]=1.54 to 1.76 (4H), 3.42 to 4.28 (38H)
$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 3

A compound represented by Formula (AC) below was synthesized by the method described in Patent Document 1.

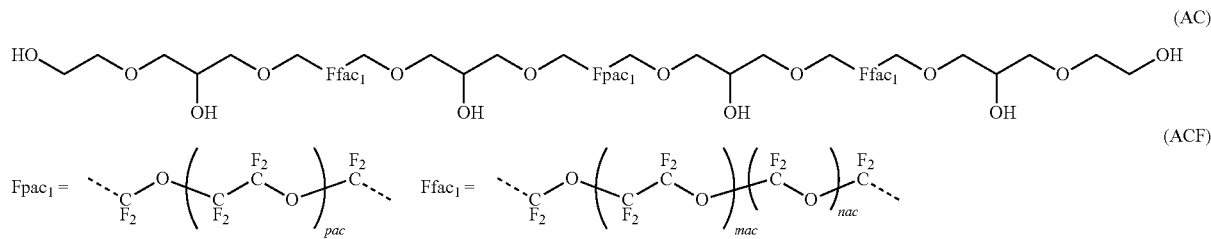

(AC)

(ACF)

(Fpac₁ and Ffac₁ in Formula (AC) are represented by Formula (ACF), pac indicating the average degree of polymerization in Fpac₁ is 2.5, and mac and nac indicating the average degree of polymerization in Ffac₁ each independently represent 2.5.)

$^1$H-NMR and $^{19}$F-NMR measurements of the obtained compound (AC) were carried out, and the structure was identified from the following results.

(Identification data) $^1$H-NMR (CD$_3$COCD$_3$): δ [ppm]= 3.46 to 4.18 (46H)
$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 4

A compound represented by Formula (AD) below was synthesized by the method described in Patent Document 1.

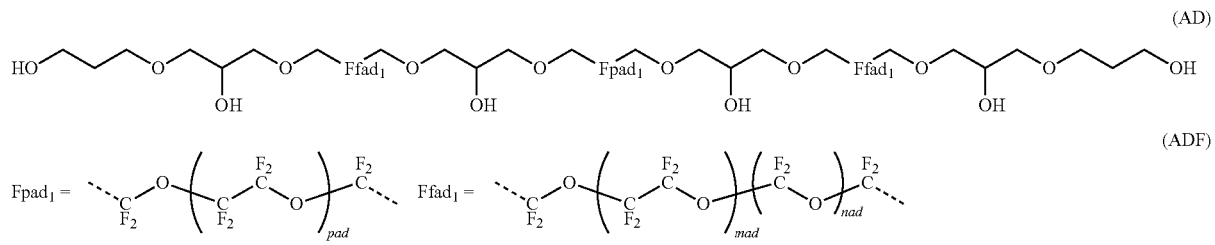

(AD)

(ADF)

(Fpad₁ and Ffad₁ in Formula (AD) are represented by Formula (ADF), pad indicating the average degree of polymerization in Fpad₁ is 2.5, and mad and nad indicating the average degree of polymerization in Ffad₁ each independently represent 2.5.)

$^1$H-NMR and $^{19}$F-NMR measurements of the obtained compound (AD) were carried out, and the structure was identified from the following results.

(Identification Data)

$^1$H-NMR (CD$_3$COCD$_3$): δ [ppm]=1.34 to 1.67 (4H), 3.39 to 4.34 (46H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 5

A compound represented by Formula (AE) below was synthesized by the method described in Patent Document 2.

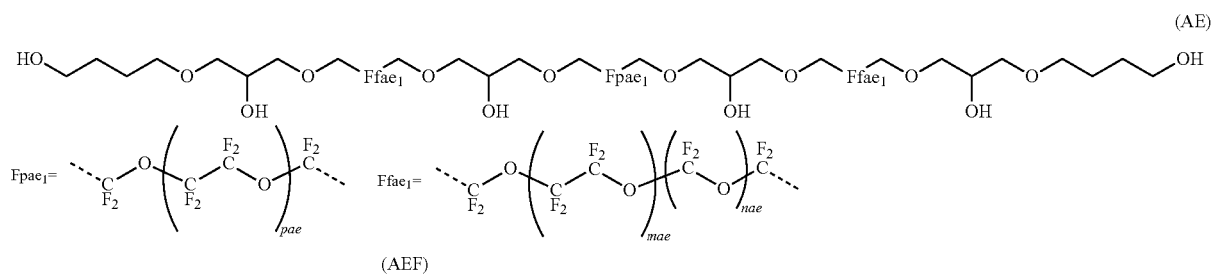

(Fpae₁ and Ffae₁ in Formula (AF) are represented by Formula (AFF), pae indicating the average degree of polymerization in Fpae₁ is 2.5, and mae and nae indicating the average degree of polymerization in Ffae₁ each independently represent 2.5.)

$^1$H-NMR and $^{19}$F-NMR measurements of the obtained compound (AE) were carried out, and the structure was identified from the following results.

(Identification Data)

$^1$H-NMR (CD$_3$COCD$_3$): δ [ppm]=1.34 to 1.65 (8H), 3.42 to 4.35 (46H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 6

The compound represented by Formula (AF) below was synthesized by the following method.

The same operation as in Example 12 was carried out except that epibromohydrin was used instead of 2-(2-bromoethyl)oxirane in the first reaction and 4.47 g of a compound represented by Formula (26) below was used instead of the compound represented by Formula (22) in the second reaction, thereby obtaining 3.9 g (molecular weight: 2143, 1.8 mmol) of a compound represented by Formula (AF) below.

The compound represented by Formula (26) was obtained by introducing a THP group as a protective group into the primary and secondary hydroxyl groups of 3-allyloxy-1,2-propanediol and oxidizing the double bond of the obtained compound.

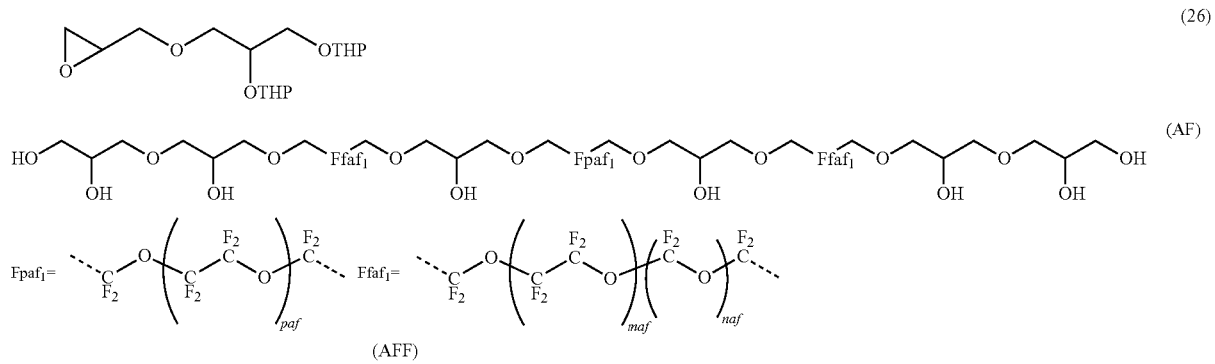

(In Formula (26), THP represents a tetrahydropyranyl group.)

(Fpaf$_1$ and Ffaf$_1$ in Formula (AF) are represented by Formula (AFF), paf indicating the average degree of polymerization in Fpaf$_1$ is 2.5, and maf and naf indicating the average degree of polymerization in Ffaf$_1$ each independently represent 2.5.)

$^1$H-NMR and $^{19}$F-NMR measurements of the obtained compound (AF) were carried out, and the structure was identified from the following results.

$^1$H-NMR (CD$_3$COCD$_3$): δ [ppm]=3.42 to 4.35 (50H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 7

A compound represented by Formula (AG) below was synthesized by the method described in Patent Document 2.

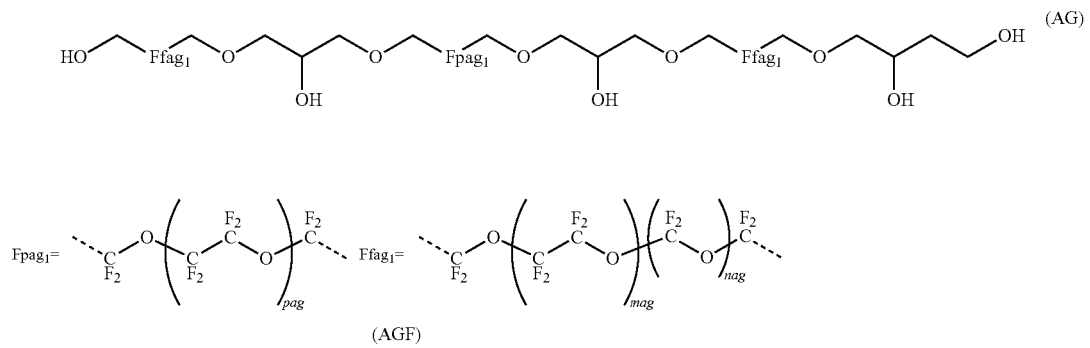

(Fpag$_1$ and Ffag$_1$ in Formula (AG) are represented by Formula (AGF), pag indicating the average degree of polymerization in Fpag$_1$ is 2.5, and mag and nag indicating the average degree of polymerization in Ffag$_1$ each independently represent 2.5.)

$^1$H-NMR and $^{19}$F-NMR measurements of the obtained compound (AG) were carried out, and the structure was identified from the following results.
(Identification Data) $^1$H-NMR (CD$_3$COCD$_3$): δ [ppm]=1.54 to 1.76 (2H), 3.42 to 4.28 (32H)

$^{19}$F-NMR (CD$_3$COCD$_3$): δ [ppm]=−55.6 to −50.6 (10F), −77.7 (4F), −78.6 (2F), −80.3 (4F), −81.3 (2F), −90.0 to −88.5 (30F)

Comparative Example 8

A compound represented by Formula (AH) below was synthesized by the method described in Patent Document 1.

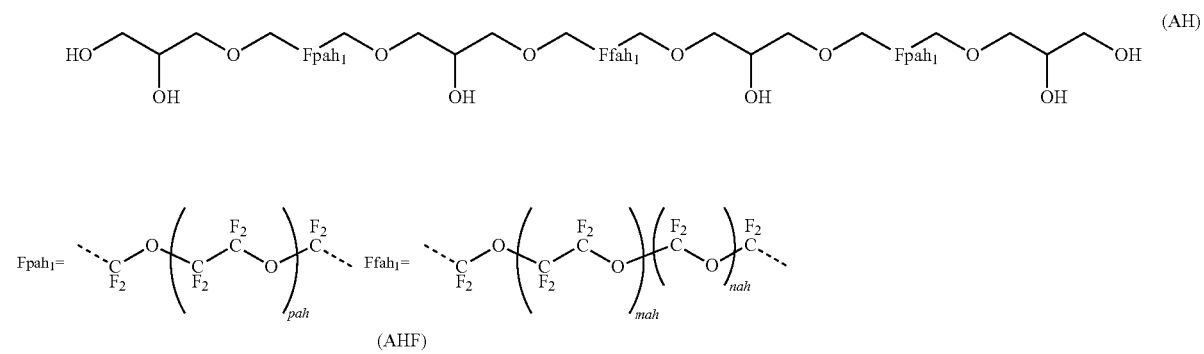

(Fpah$_1$ and Ffah$_1$ in Formula (AH) are represented by Formula (AHF), pah indicating the average degree of polymerization in Fpah$_1$ is 2.5, and mah and nah indicating the average degree of polymerization in Ffah$_1$ each independently represent 2.5.)

$^1$H-NMR and $^{19}$F-NMR measurements of the obtained compound (AH) were carried out, and the structure was identified from the following results.

(Identification Data)

$^1$H-NMR (CD$_3$COCD$_3$): δ [ppm]=3.42 to 4.28 (38H)

$^{19}$F-NMR (CD$_3$COCD$_3$): δ [ppm]=−55.6 to −50.6 (5F), −77.7 (2F), −78.6 (4F), −80.3 (2F), −81.3 (4F), −90.0 to −88.5 (30F)

Comparative Example 9

A compound represented by Formula (AI) below was synthesized by the method described in Patent Document 1.

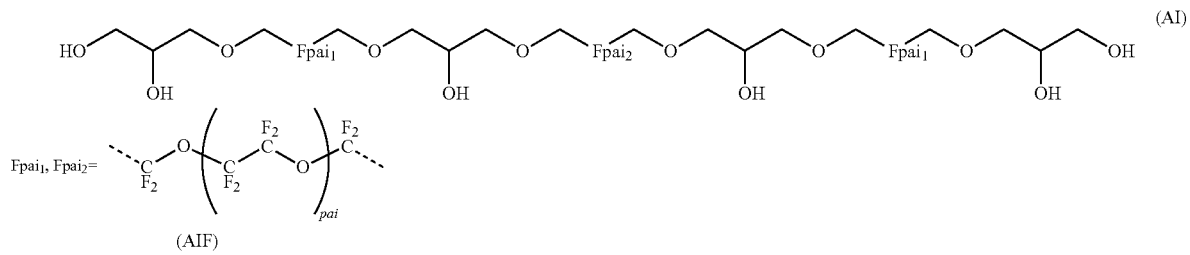

(Fpa$_1$ and Fpa$_2$ in Formula (AI) are represented by Formula (AIF), pai indicating the average degree of polymerization in Fpai$_1$ is 2.5, and pai indicating the average degree of polymerization in Fpa$_2$ is 2.5.)

$^1$H-NMR and $^{19}$F-NMR measurements of the obtained compound (AI) were carried out, and the structure was identified from the following results.

(Identification Data)

$^1$H-NMR (CD$_3$COCD$_3$): δ [ppm]=3.42 to 4.28 (38H)

$^{19}$F-NMR (CD$_3$COCD$_3$): δ [ppm]=−78.6 (6F), −81.3 (6F), −90.0 to −88.5 (30F)

Comparative Example 10

A compound represented by Formula (AJ) below was synthesized by the method described in Patent Document 1.

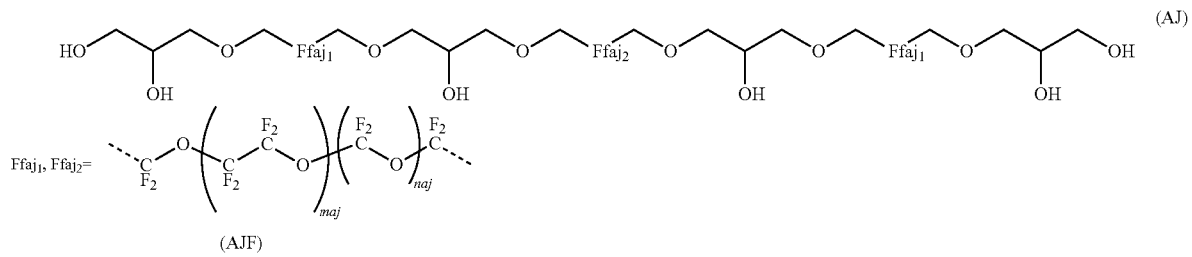

(Ffaj$_1$ and Ffaj$_2$ in Formula (AJ) are represented by Formula (AJF), maj and naj indicating the average degree of polymerization in Ffaj$_1$ is 2.5. and maj and naj indicating the average degree of polymerization in Ffaj$_2$ represent 2.5.)

$^1$H-NMR and $^{19}$F-NMR measurements of the obtained compound (AJ) were carried out, and the structure was identified from the following results.

(Identification Data)

$^1$H-NMR (CD$_3$COCD$_3$): δ [ppm]=3.42 to 4.28 (38H)

$^{19}$F-NMR (CD$_3$COCD$_3$): δ [ppm]=−55.6 to −50.6 (15F), −77.7 (6F), −80.3 (6F), −91.0 to −88.5 (30F)

Comparative Example 11

A compound represented by Formula (AK) below was synthesized by the method described in Patent Document 2.

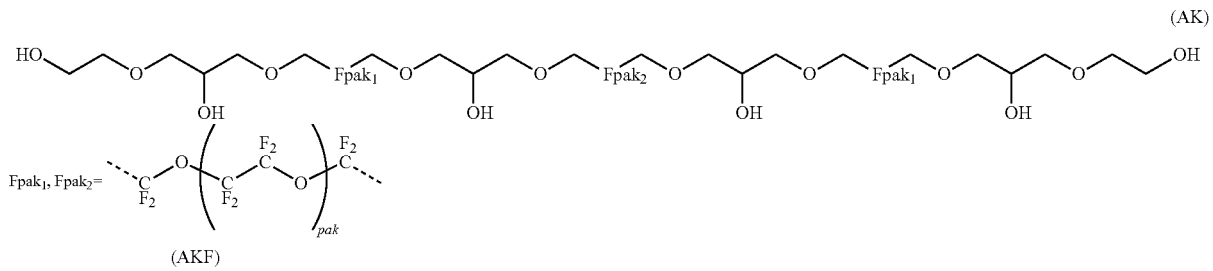

(Fpak$_1$ and Fpak$_2$ in Formula (AK) are represented by Formula (AKF), pak indicating the average degree of polymerization in Fpak$_1$ is 2.5, and pak indicating the average degree of polymerization in Fpak$_2$ represents 2.5.)

$^1$H-NMR and $^{19}$F-NMR measurements of the obtained compound (AK) were carried out, and the structure was identified from the following results.

(Identification Data)
$^1$H-NMR (CD$_3$COCD$_3$): δ [ppm]=$^1$H-NMR (CD$_3$COCD$_3$): δ [ppm]=3.46 to 4.18 (46H)
$^{19}$F-NMR (CD$_3$COCD$_3$): δ [ppm]=−78.6 (6F), −81.3 (6F), −90.0 to −88.5 (30F)

Comparative Example 12

A compound represented by Formula (AL) below was synthesized by the method described in Patent Document 2.

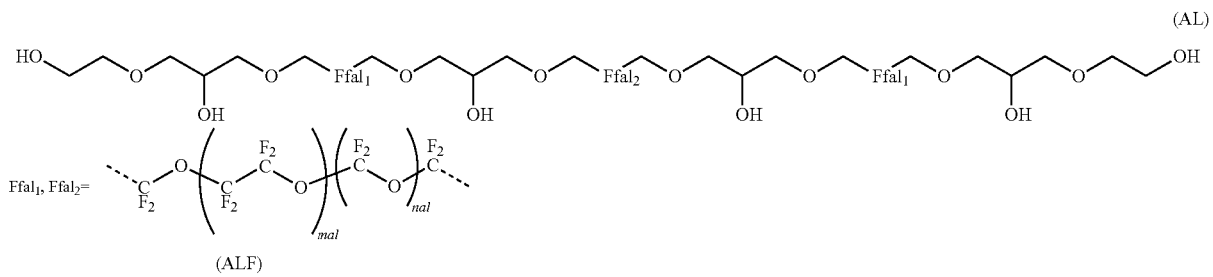

(Ffal$_1$ and Ffal$_2$ in Formula (AL) are represented by Formula (ALF), mal and nal indicating the average degree of polymerization in Ffal$_1$ are 2.5, and mal and nal indicating the average degree of polymerization in Ffal$_2$ represent 2.5.)

$^1$H-NMR and $^{19}$F-NMR measurements of the obtained compound (AL) were carried out, and the structure was identified from the following results.

(Identification Data)
$^1$H-NMR (CD$_3$COCD$_3$): δ [ppm]=$^1$H-NMR (CD$_3$COCD$_3$): δ [ppm]=3.46 to 4.18 (46H)
$^{19}$F-NMR (CD$_3$COCD$_3$): δ [ppm]=−55.6 to −50.6 (15F), −77.7 (6F), −80.3 (6F), −91.0 to −88.5 (30F)

Comparative Example 13

A compound represented by Formula (AM) below was synthesized by the method described in Patent Document 2.

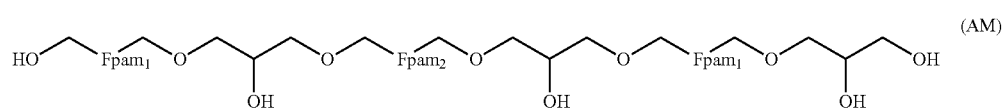

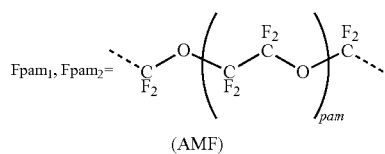

(AMF)

(Fpam$_1$ and Fpam$_2$ in Formula (AM) are represented by Formula (AMF), pam indicating the average degree of polymerization in Fpam$_1$ is 2.5, and pam indicating the average degree of polymerization in Fpam$_2$ represents 2.5.)

$^1$H-NMR and $^{19}$F-NMR measurements of the obtained compound (AM) were carried out, and the structure was identified from the following results.
(Identification data)
$^1$H-NMR (CD$_3$COCD$_3$): δ [ppm]=3.46 to 4.18 (32H)
$^{19}$F-NMR (CD$_3$COCD$_3$): δ [ppm]=−78.6 (6F), −81.3 (6F), −90.0 to −88.5 (30F)

Comparative Example 14

The compound represented by Formula (AN) below was synthesized by the following method.

14.0 g of the compound represented by HOCH$_2$CF$_2$O(CF$_2$CF$_2$O)$_r$CF$_2$CH$_2$OH (r indicating the average degree of polymerization in the formula is 2.5) (number average molecular weight: 468, molecular weight distribution: 1.1), 2.34 g (molecular weight: 130.19, 18 mmol) of tert-butyl glycidyl ether, and 28 mL of t-butanol were added to a 200 mL eggplant flask in a nitrogen gas atmosphere and stirred until the mixture became uniform at room temperature. 1.0 g (molecular weight: 112.2, 9 mmol) of potassium tert-butoxide was further added to this uniform solution and reacted by being stirred at 70° C. for 16 hours.

A reaction product obtained after the reaction was cooled to 25° C., moved to a separatory funnel containing 100 mL of water, and extracted three times with 100 mL of ethyl acetate. An organic layer thereof was washed with water and dehydrated with anhydrous sodium sulfate. After the drying agent was filtered, the filtrate was concentrated, and the residue was purified by silica gel column chromatography, thereby obtaining 7.2 g of a compound represented by Formula (27) below (molecular weight: 598, 12.0 mmol).

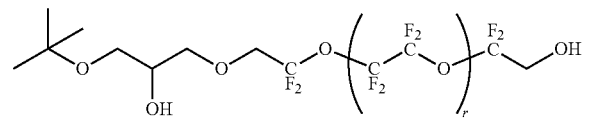
(27)

(In Formula (27), r indicating the average degree of polymerization is 2.5.)

7.2 g of the compound represented by Formula (27) (r indicating the average degree of polymerization in the formula is 2.5), 0.67 g of potassium tert-butoxide, and 10.5 mL of t-butanol were added to a 200 mL eggplant flask in a nitrogen gas atmosphere and stirred until the mixture became uniform at room temperature. 2.60 g of a compound represented by Formula (28) below was further added to this uniform liquid and reacted by being stirred at 70° C. for 16 hours.

The compound represented by Formula (28) was synthesized by oxidizing diallyl ether.

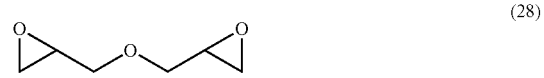
(28)

A reaction product obtained after the reaction was cooled to 25° C., moved to a separatory funnel containing 100 ml of water, and extracted three times with 100 mL of ethyl acetate. An organic layer thereof was washed with water and dehydrated with anhydrous sodium sulfate. After the drying agent was filtered, the filtrate was concentrated, and the residue was purified by silica gel column chromatography, thereby obtaining 5.9 g of a compound represented by Formula (29) below (molecular weight: 728, 7.7 mmol).

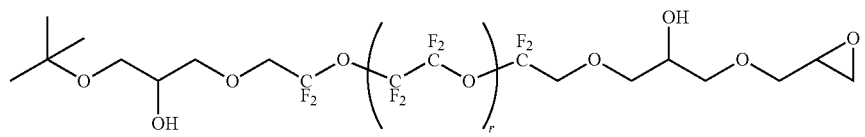
(29)

(In Formula (29), r indicating the average degree of polymerization is 2.5.)

5.9 g of the compound represented by Formula (29) (r indicating the average degree of polymerization in the formula is 2.5), 0.12 g of potassium tert-butoxide, and 2.8 mL of t-butanol were added to a 200 mL eggplant flask in a nitrogen gas atmosphere and stirred until the mixture became uniform at room temperature. 1.6 g of the compound represented by HOCH$_2$CF$_2$O(CF$_2$CF$_2$O)$_r$CF$_2$CH$_2$OH (r indicating the average degree of polymerization in the formula is 2.5) (number average molecular weight: 468, molecular weight distribution: 1.1) was further added to this uniform liquid and reacted by being stirred at 70° C. for 16 hours.

A reaction product obtained after the reaction was cooled to 25° C., moved to a separatory funnel containing 100 mL of water, and extracted three times with 100 mL of ethyl acetate. An organic layer thereof was washed with water and dehydrated with anhydrous sodium sulfate. After the drying agent was filtered, the filtrate was concentrated, and the residue was purified by silica gel column chromatography, thereby obtaining 3.3 g of a compound represented by Formula (AN) below (molecular weight: 1812, 2.4 mmol).

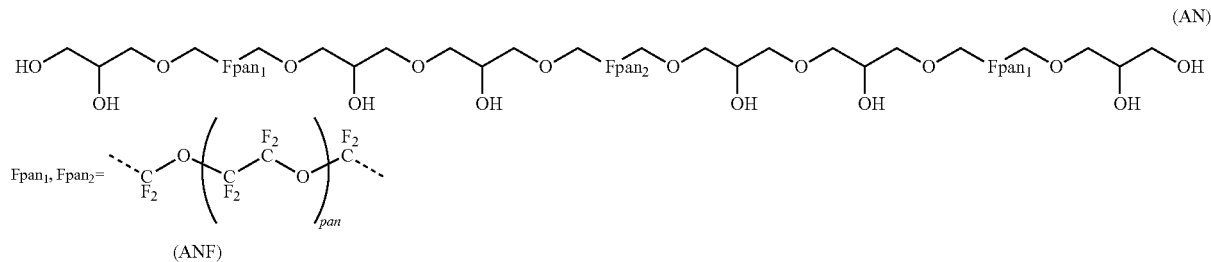

(Fpan$_1$ and Fpan$_2$ in Formula (AN) are represented by Formula (ANF), pan indicating the average degree of polymerization in Fpan$_1$ is 2.5, and pan indicating the average degree of polymerization in Fpan$_2$ represents 2.5.)

$^1$H-NMR and $^{19}$F-NMR measurements of the obtained compound (AN) were carried out, and the structure was identified from the following results.

$^1$H-NMR (CD$_3$COCD$_3$): δ [ppm]=3.47 to 4.24 (50H)

$^{19}$F-NMR (CD$_3$COCD$_3$): δ [ppm]=−78.6 (6F), −81.3 (6F), −90.0 to −88.5 (30F)

Structures of $R^1$ and $R^7$ (e and f in Formula (4-1), g and h in Formula (4-2), i in Formula (4-3), j in Formula (4-4), and Formula (4-5)), structures of $R^3$ and $R^5$ (a and b in Formula (2) and c and d in Formula (3)), and structures of $R^2$, $R^4$, and $R^6$ (k and l in Formula (5), m in Formula (6), and n in Formula (7)) when the thus obtained compounds of Examples 1 to 20 and Comparative Examples 1 to 14 are applied to Formula (1) are shown in Tables 1 and 2.

TABLE 1

|  | $R^1$, $R^7$ | $R^2$, $R^6$ | $R^4$ | $R^3$ | $R^5$ | Compound |
|---|---|---|---|---|---|---|
| Example 1 | Formula (4-2) g = 1, h = 2 | Formula (6) m = 2.5 | Formula (6) m = 2.5 | Formula (2) a = 2, b = 1 | Formula (3) c = 2, d = 1 | (A) |
| Example 2 | Formula (4-2) g = 2, h = 2 | Formula (7) n = 2.5 | Formula (7) n = 2.5 | Formula (2) a = 2, b = 1 | Formula (3) c = 2, d = 1 | (B) |
| Example 3 | Formula (4-1) e = 0, f = 1 | Formula (5) k = 2.5 l = 2.5 | Formula (5) k = 2.5 l = 2.5 | Formula (2) a = 2, b = 1 | Formula (3) c = 2, d = 1 | (C) |
| Example 4 | Formula (4-5) | Formula (6) m = 2.5 | Formula (6) m = 2.5 | Formula (2) a = 2, b = 1 | Formula (3) c = 2, d = 1 | (D) |
| Example 5 | Formula (4-2) g = 1, h = 1 | Formula (7) n = 2.5 | Formula (7) n = 2.5 | Formula (2) a = 2, b = 1 | Formula (3) c = 2, d = 1 | (E) |
| Example 6 | Formula (4-3) i = 1 | Formula (7) n = 2.5 | Formula (7) n = 2.5 | Formula (2) a = 2, b = 1 | Formula (3) c = 2, d = 1 | (F) |
| Example 7 | Formula (4-1) e = 1, f = 1 | Formula (5) k = 2.5 l = 2.5 | Formula (5) k = 2.5 l = 2.5 | Formula (2) a = 2, b = 1 | Formula (3) c = 2, d = 1 | (G) |
| Example 8 | Formula (4-1) e = 0, f = 2 | Formula (6) m = 2.5 | Formula (6) m = 2.5 | Formula (2) a = 3, b = 1 | Formula (3) c = 3, d = 1 | (H) |
| Example 9 | Formula (4-4) j = 2 | Formula (7) n = 2.5 | Formula (7) n = 2.5 | Formula (2) a = 3, b = 1 | Formula (3) c = 3, d = 1 | (I) |
| Example 10 | Formula (4-2) g = 2, h = 1 | Formula (5) k = 2.5 l = 2.5 | Formula (5) k = 2.5 l = 2.5 | Formula (2) a = 3, b = 1 | Formula (3) c = 3, d = 1 | (J) |
| Example 11 | Formula (4-1) e = 1, f = 1 | Formula (7) n = 2.5 | Formula (6) m = 2.5 | Formula (2) a = 2, b = 1 | Formula (3) c = 2, d = 1 | (K) |
| Example 12 | Formula (4-4) j = 1 | Formula (5) k = 2.5 l = 2.5 | Formula (6) m = 2.5 | Formula (2) a = 2, b = 1 | Formula (3) c = 2, d = 1 | (L) |
| Example 13 | Formula (4-2) g = 1, h = 2 | Formula (7) n = 2.5 | Formula (6) m = 2.5 | Formula (2) a = 3, b = 1 | Formula (3) c = 3, d = 1 | (M) |
| Example 14 | Formula (4-2) g = 2, h = 2 | Formula (6) m = 2.5 | Formula (7) n = 2.5 | Formula (2) a = 2, b = 1 | Formula (3) c = 2, d = 1 | (N) |
| Example 15 | Formula (4-5) | Formula (6) m = 2.5 | Formula (7) n = 2.5 | Formula (2) a = 2, b = 1 | Formula (3) c = 2, d = 1 | (O) |
| Example 16 | Formula (4-2) g = 1, h = 3 | Formula (5) k = 2.5 l = 2.5 | Formula (7) n = 2.5 | Formula (2) a = 2, b = 1 | Formula (3) c = 2, d = 1 | (P) |
| Example 17 | Formula (4-2) g = 1, h = 1 | Formula (5) k = 2.5 l = 2.5 | Formula (7) n = 2.5 | Formula (2) a = 3, b = 1 | Formula (3) c = 3, d = 1 | (Q) |

TABLE 1-continued

| | R¹, R⁷ | R², R⁶ | R⁴ | R³ | R⁵ | Compound |
|---|---|---|---|---|---|---|
| Example 18 | Formula (4-2) g = 2, h = 1 | Formula (6) m = 2.5 | Formula (5) k = 2.5 l = 2.5 | Formula (2) a = 2, b = 1 | Formula (3) c = 2, d = 1 | (R) |
| Example 19 | Formula (4-1) e = 0, f = 3 | Formula (7) n = 2.5 | Formula (5) k = 2.5 l = 2.5 | Formula (2) a = 2, b = 1 | Formula (3) c = 2, d = 1 | (S) |
| Example 20 | Formula (4-1) e = 1, f = 2 | Formula (6) m = 2.5 | Formula (5) k = 2.5 l = 2.5 | Formula (2) a = 3, b = 1 | Formula (3) c = 3, d = 1 | (T) |

TABLE 2

| | —R¹ | R², R⁶ | R⁴ | R³ | R⁵ | —R⁷ | Compound |
|---|---|---|---|---|---|---|---|
| Comparative Example 1 | (glycerol ether structure with OH, OH) | Formula (5) k = 2.5 l = 2.5 | Formula (6) m = 2.5 | Formula (2) a = 1, b = 1 | Formula (3) c = 1, d = 1 | same as —R¹ | (AA) |
| Comparative Example 2 | Formula (4-1) c = 0, f = 1 | Formula (5) k = 2.5 l = 2.5 | Formula (6) m = 2.5 | Formula (2) a = 1, b = 1 | Formula (3) c = 1, d = 1 | same as —R¹ | (AB) |
| Comparative Example 3 | Formula (4-2) g = 1, h = 1 | Formula (5) k = 2.5 l = 2.5 | Formula (6) m = 2.5 | Formula (2) a = 1, b = 1 | Formula (3) c = 1, d = 1 | same as —R¹ | (AC) |
| Comparative Example 4 | Formula (4-2) g = 1, h = 2 | Formula (5) k = 2.5 l = 2.5 | Formula (6) m = 2.5 | Formula (2) a = 1, b = 1 | Formula (3) c = 1, d = 1 | same as —R¹ | (AD) |
| Comparative Example 5 | Formula (4-2) g = 1, h = 3 | Formula (5) k = 2.5 l = 2.5 | Formula (6) m = 2.5 | Formula (2) a = 1, b = 1 | Formula (3) c = 1, d = 1 | same as —R¹ | (AE) |
| Comparative Example 6 | (diglycerol ether structure with OH, OH, OH) | Formula (5) k = 2.5 l = 2.5 | Formula (6) m = 2.5 | Formula (2) a = 1, b = 1 | Formula (3) c = 1, d = 1 | same as —R¹ | (AF) |
| Comparative Example 7 | —OH | Formula (5) k = 2.5 l = 2.5 | Formula (6) m = 2.5 | Formula (2) a = 1, b = 1 | Formula (3) c = 1, d = 1 | Formula (4-1) e = 0, f = 1 | (AG) |
| Comparative Example 8 | (glycerol ether structure with OH, OH) | Formula (6) m = 2.5 | Formula (5) k = 2.5 l = 2.5 | Formula (2) a = 1, b = 1 | Formula (3) c = 1, d = 1 | same as —R¹ | (AH) |
| Comparative Example 9 | (glycerol ether structure with OH, OH) | Formula (6) m = 2.5 | Formula (6) m = 2.5 | Formula (2) a = 1, b = 1 | Formula (3) c = 1, d = 1 | same as —R¹ | (AI) |
| Comparative Example 10 | (glycerol ether structure with OH, OH) | Formula (5) k = 2.5 l = 2.5 | Formula (5) k = 2.5 l = 2.5 | Formula (2) a = 1, b = 1 | Formula (3) c = 1, d = 1 | same as —R¹ | (AJ) |
| Comparative Example 11 | Formula (4-2) g = 1, h = 1 | Formula (6) m = 2.5 | Formula (6) m = 2.5 | Formula (2) a = 1, b = 1 | Formula (3) c = 1, d = 1 | same as —R¹ | (AK) |
| Comparative Example 12 | Formula (4-2) g = 1, h = 1 | Formula (5) k = 2.5 l = 2.5 | Formula (5) k = 2.5 l = 2.5 | Formula (2) a = 1, b = 1 | Formula (3) c = 1, d = 1 | same as —R¹ | (AL) |
| Comparative Example 13 | —OH | Formula (6) m = 2.5 | Formula (6) m = 2.5 | Formula (2) a = 1, b = 1 | Formula (3) c = 1, d = 1 | (glycerol ether structure with OH, OH) | (AM) |

TABLE 2-continued

| | —R¹ | R², R⁶ | R⁴ | R³ | R⁵ | —R⁷ | Compound |
|---|---|---|---|---|---|---|---|
| Comparative Example 14 | 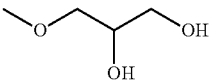 | Formula (6) m = 2.5 | Formula (6) m = 2.5 | Formula (2) a = 1, b = 2 | Formula (3) c = 1, d = 2 | same as —R¹ | (AN) |

In addition, the number average molecular weights (Mn) of the compounds of Examples 1 to 20 and Comparative Examples 1 to 14 were obtained by the above-described $^1$H-NMR and $^{19}$F-NMR measurement. The results are shown in Table 3. It is inferred that, in the values of the average molecular weight of the synthesized compounds, variations of approximately 1 to 5 may exist depending on, for example, the molecular weight distributions of the fluoropolyether used as a raw material of the compounds and differences in the operation at the time of synthesizing the compounds.

Dupont-Mitsui Fluorochemicals Co., Ltd.), which is a fluorine-based solvent, diluted with VERTREL XF such that the film thicknesses of the coating films became 9 Å to 11 Å when applied onto protective layers, and used as solutions for forming a lubricating layer.

"Magnetic Recording Media"

Magnetic recording media each having an adhesive layer, a soft magnetic layer, a first underlayer, a second underlayer, a magnetic layer, and a protective layer sequentially provided on a substrate having a diameter of 65 mm were

TABLE 3

| | Compound | Number average molecular weight (Mn) | Film thickness (Å) | Corrosion resistance test Burnished | Unburnished |
|---|---|---|---|---|---|
| Example 1 | (A) | 1809 | 10 | B | A |
| Example 2 | (B) | 2632 | 10 | A | A |
| Example 3 | (C) | 2216 | 10 | B | A |
| Example 4 | (D) | 1897 | 10 | A | A |
| Example 5 | (E) | 2456 | 10 | B | A |
| Example 6 | (F) | 2484 | 11 | A | A |
| Example 7 | (G) | 2364 | 10 | A | A |
| Example 8 | (H) | 1777 | 10 | A | A |
| Example 9 | (I) | 2688 | 11 | A | A |
| Example 10 | (J) | 2452 | 10 | A | A |
| Example 11 | (K) | 2319 | 11 | A | A |
| Example 12 | (L) | 2287 | 10 | A | A |
| Example 13 | (M) | 2287 | 10 | A | A |
| Example 14 | (N) | 2182 | 10 | A | A |
| Example 15 | (O) | 2122 | 10 | A | A |
| Example 16 | (P) | 2392 | 10 | A | A |
| Example 17 | (Q) | 2364 | 10 | A | A |
| Example 18 | (R) | 2094 | 10 | A | A |
| Example 19 | (S) | 2392 | 10 | A | A |
| Example 20 | (T) | 2090 | 10 | A | A |
| Comparative Example 1 | (AA) | 1994 | 10 | E | E |
| Comparative Example 2 | (AB) | 2023 | 10 | C | C |
| Comparative Example 3 | (AC) | 2083 | 10 | E | E |
| Comparative Example 4 | (AD) | 2111 | 10 | D | C |
| Comparative Example 5 | (AE) | 2139 | 10 | C | C |
| Comparative Example 6 | (AF) | 2143 | 11 | E | D |
| Comparative Example 7 | (AG) | 1934 | 10 | E | E |
| Comparative Example 8 | (AH) | 1829 | 11 | E | E |
| Comparative Example 9 | (AI) | 1664 | 10 | E | E |
| Comparative Example 10 | (AJ) | 2160 | 10 | E | E |
| Comparative Example 11 | (AK) | 1752 | 10 | D | D |
| Comparative Example 12 | (AL) | 2248 | 11 | D | D |
| Comparative Example 13 | (AM) | 1590 | 10 | E | E |
| Comparative Example 14 | (AN) | 1812 | 11 | E | E |

Next, solutions for forming a lubricating layer were prepared using the compounds obtained in Examples 1 to 20 and Comparative Examples 1 to 14 by a method shown below. Moreover, lubricating layers of magnetic recording media were formed using the obtained solutions for forming a lubricating layer by a method shown below, and magnetic recording media of Examples 1 to 20 and Comparative Examples 1 to 14 were obtained.

"Solutions for Forming Lubricating Layer"

The compounds obtained in Examples 1 to 20 and Comparative Examples 1 to 14 were each dissolved in VERTREL (registered trademark) XF (trade name, manufactured by prepared. As the protective layer, a carbon layer with a thickness of 1 to 5 nm was used.

The solutions for forming a lubricating layer of Examples 1 to 20 and Comparative Examples 1 to 14 were each applied by the dipping method onto the protective layers of the magnetic recording media in which the individual layers up to the protective layer had been formed. The dipping method was carried out under conditions of an immersion speed of 10 mm/sec, an immersion time of 30 seconds and a lifting speed of 1.2 mm/sec.

Thereafter, a burnishing step was performed in which burnishing tape holding abrasive grains having a grain size

6000 was scanned on the surface of each of the magnetic recording media on which the lubricating layer was formed.

The magnetic recording media after the burnishing step were placed in a thermostatic chamber at 120° C. to perform a heat treatment for 10 minutes.

Magnetic recording media (which were burnished) of Examples 1 to 20 and Comparative Examples 1 to 14 were obtained through the above-described steps.

In addition, magnetic recording media (which were unburnished) of Examples 1 to 20 and Comparative Examples 1 to 14 were obtained in the same manner as the burnished magnetic recording media except that a burnishing step was not performed.

(Film Thickness Measurement)

The film thicknesses of the lubricating layers in the magnetic recording media (which were burnished and unburnished) of Examples 1 to 20 and Comparative Examples 1 to 14 thus obtained were measured using a Fourier transform infrared spectrophotometer (FT-IR) (trade name: Nicolet iS50, manufactured by Thermo Fisher Scientific Inc.). In all of the magnetic recording media of Examples 1 to 20 and Comparative Examples 1 to 14, there was no difference in the film thickness of the lubricating layer between being burnished and being unburnished. The results are shown in Table 3.

Next, corrosion resistance tests shown below were performed on the burnished and unburnished magnetic recording media of Examples 1 to 20 and Comparative Examples 1 to 14.

(Corrosion Resistance Tests)

The magnetic recording media were exposed to conditions of 85° C. and a relative humidity of 90% for 48 hours. Thereafter, number of corroded spots of the magnetic recording media was counted using an optical surface analyzer and evaluated based on the following evaluation criteria. The results are shown in Table 3.

"Evaluation Criteria"

A: Less than 120

B: Greater than or equal to 120 and less than 150

C: Greater than or equal to 150 and less than 350

D: Greater than or equal to 350 and less than 1,000

E: Greater than or equal to 1,000

As shown in Table 3, the magnetic recording media of Examples 1 to 20 having a lubricating layer containing the compound represented by Formula (1) showed a favorable corrosion resistance with the corrosion resistance test results being A in the case where the magnetic recording media were not subjected to tape burnishing and A or B in the case where the magnetic recording media were subjected to tape burnishing.

On the other hand, compared to the magnetic recording media of Examples 1 to 20, the magnetic recording media of Comparative Examples 1 to 14 showed an inferior corrosion resistance with the corrosion resistance test results being C to E in both cases where the magnetic recording media were subjected to and not subjected to tape burnishing.

More specifically, in the magnetic recording media of Examples 1 to 20, lubricating layers contain compounds in which $R^3$ in Formula (1) is Formula (2) (in Formula (2), a is 2 and b is 1) and $R^5$ is Formula (3) (in Formula (3), c is 2 and d is 1) or $R^3$ is Formula (2) (in Formula (2), a is 3 and b is 1) and $R^5$ is Formula (3) (in Formula (3), c is 3 and d is 1), and $R^1$ and $R^7$ are terminal groups represented by Formulae (4-1) to (4-5). For this reason, the magnetic recording media of Examples 1 to 20 have a larger number of carbon atoms contained in $R^3$ and $R^5$ of the compounds in the lubricating layers and more favorable hydrophobicity than the magnetic recording media of Comparative Examples 1 to 14. Moreover, due to the hydrophobicity of the carbon atoms to which the polar groups contained in $R^1$ and $R^7$ are bound and the carbon atoms contained in linking groups in $R^1$ and $R^7$, these lubricating layers have appropriate hydrophobicity. Furthermore, these lubricating layers have favorable adhesion properties with respect to protective layers due to the polar groups in $R^3$, $R^5$, $R^1$, and $R^7$. Thus, it is inferred that, in the magnetic recording media of Examples 1 to 20, water was prevented from intruding into the lubricating layers from outside and a favorable corrosion suppressing effect was obtained.

Furthermore, in the magnetic recording media of Examples 8 to 10, 13, 17, and 20, the corrosion resistance test results showed A in all cases of being burnished and unburnished, thereby showing a particularly excellent corrosion suppressing effect. It is inferred that this may be because the lubricating layers of the magnetic recording media of Examples 8 to 10, 13, 17, and 20 contained compounds in which $R^3$ is Formula (2) (in Formula (2), a is 3 and b is 1) and $R^5$ is Formula (3) (in Formula (3), c is 3 and d is 1), thereby having a larger number of carbon atoms (longer methylene chain) in $R^3$ and $R^5$ of the compounds and more favorable hydrophobicity.

For example, when comparing magnetic recording media with each other which have the same terminal group represented by $R^1$ and $R^7$ and different linking groups represented by $R^3$ and $R^5$ (Comparative Example 4 with respect to Examples 1 and 13; Comparative Example 2 with respect to Example 3; Comparative Examples 3, 11, and 12 with respect to Examples 5 and 17; Comparative Example 5 with respect to Example 16), the larger the number of carbon atoms contained in $R^3$ and $R^5$ (the longer the methylene chain), the higher the corrosion suppressing effect is exhibited.

In addition, the magnetic recording media of Examples 3, 4, 7, 8, 11, 15, 19, and 20 in which $R^1$ and $R^7$ are terminal groups represented by Formulae (4-1) and (4-5) in which a linking group between a carbon atom to which a terminal polar group is bound and a carbon atom to which a polar group adjacent to the terminal polar group is bound does not contain an ether bond (—O—) showed a favorable corrosion suppressing effect. It is inferred that this may be because the linking groups contained in the terminal groups represented by Formulae (4-1) and (4-5) do not contain an ether bond and contain an appropriate number of carbon atoms, and therefore a lubricating layer having favorable hydrophobicity was obtained and the intrusion of water was prevented.

In addition, the magnetic recording media of Examples 1, 2, 5, 6, 9, 10, 12 to 14, and 16 to 18 in which $R^1$ and $R^7$ are terminal groups represented by Formulae (4-2), (4-3), and (4-4) in which a linking group between a carbon atom to which a terminal polar group is bound and a carbon atom to which a polar group adjacent to the terminal polar group is bound contains an ether bond showed a favorable corrosion suppressing effect. It is inferred that this may be because the linking groups contained in the terminal groups represented by Formulae (4-2), (4-3), and (4-4) contain an appropriate number of carbon atoms, and therefore a lubricating layer having favorable hydrophobicity was obtained and the intrusion of water was prevented.

Furthermore, in Examples 2, 4, 7, 9 to 12, 14, 15, 18, and 20 in which $R^1$ and $R^7$ in Formula (1) each have three hydroxyl groups, the corrosion resistance test results showed A in all cases of being burnished and unburnished, thereby showing a particularly excellent corrosion suppressing effect. It is thought that this is because the three hydroxyl groups each contained in $R^1$ and $R^7$ in Formula (1) exhibited excellent adhesion properties with respect to protective layers. If the adhesion properties between a lubricating layer and a protective layer are excellent, water can be prevented from intruding into the lubricating layer from outside.

On the other hand, in Comparative Example 6, although $R^1$ and $R^7$ in Formula (1) each have three hydroxyl groups, the corrosion resistance test results showed E (burnished) and D (unburnished). It is inferred that this may be because, in the compound contained in the lubricating layer in the magnetic recording medium of Comparative Example 6, $R^3$ in Formula (1) is Formula (2) (in Formula (2), a is 1 and b is 1), $R^5$ is Formula (3) (in Formula (3), c is 1 and d is 1), and a carbon atom to which a terminal hydroxyl group contained in $R^1$ and $R^7$ is bound is bound to a carbon atom to which a hydroxyl group adjacent to the terminal hydroxyl group is bound. In the lubricating layer containing such a compound, either the terminal hydroxyl group or the hydroxyl group adjacent to the terminal hydroxyl group is oriented in the opposite direction with respect to a protective layer, and therefore adhesion of the hydroxyl groups with respect to the protective layer is less likely to be obtained. In addition, the lubricating layer containing such a compound cannot obtain sufficient hydrophobicity.

In addition, favorable corrosion resistance test results were obtained in Examples 1 to 10 in which $R^2$, $R^4$, and $R^6$ in Formula (1) were any one of PFPE chains selected from Formulae (5), (6), and (7) and in Examples 11 to 20 in which $R^2$, $R^4$, and $R^6$ were two types of PFPE chains selected from Formulae (5), (6), and (7).

In addition, the corrosion resistance test results were E in both Comparative Examples 7 and 13 in which $R^3$ in Formula (1) was Formula (2) (in Formula (2), a was 1 and b was 1), $R^5$ was Formula (3) (in Formula (3), c was 1 and d was 1), and $R^1$ was —OH. It is inferred that this may be because the hydrophobicity of lubricating layers is insufficient, sufficient adhesion of hydroxyl groups in $R^1$ with respect to protective layers is not obtained, and the coating rates of the lubricating layers are low.

INDUSTRIAL APPLICABILITY

By using the lubricant for a magnetic recording medium containing the fluorine-containing ether compound of the present invention, a lubricating layer highly effective in suppressing corrosion of a magnetic recording medium can be formed.

REFERENCE SIGNS LIST

10 Magnetic recording medium
11 Substrate
12 Adhesive layer
13 Soft magnetic layer
14 First underlayer
15 Second underlayer
16 Magnetic layer
17 Protective layer
18 Lubricating layer

The invention claimed is:

1. A fluorine-containing ether compound represented by Formula (1) below,

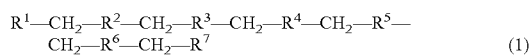

(in Formula (1), $R^1$ and $R^7$ are each independently a terminal group having two or three polar groups, in which individual polar groups are bound to different carbon atoms, wherein the different carbon atoms, to which the individual polar groups are bound, are bound to each other via a linking group containing a carbon atom to which no polar group is bound, $R^2$, $R^4$, and $R^6$ are the same or different perfluoropolyether chains, $R^3$ is a linking group represented by Formula (2) below, $R^5$ is a linking group represented by Formula (3) below),

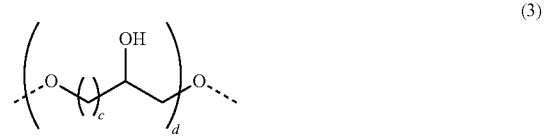

(in Formula (2), a is an integer of 1 to 3 and b is an integer of 1 to 2, and in Formula (3), c is an integer of 1 to 3 and d is an integer of 1 to 2, provided that a in Formula (2) and c in Formula (3) are not 1 at the same time).

2. The fluorine-containing ether compound according to claim 1, wherein a in Formula (2) above is an integer of 2 to 3, and c in Formula (3) above is an integer of 2 to 3.

3. The fluorine-containing ether compound according to claim 1, wherein all of the polar groups in $R^1$ and $R^7$ in Formula (1) above are hydroxyl groups.

4. The fluorine-containing ether compound according to claim 1, wherein —$R^1$ and —$R^7$ in Formula (1) above are each independently a terminal group represented by Formulae (4-1) to (4-5) below,

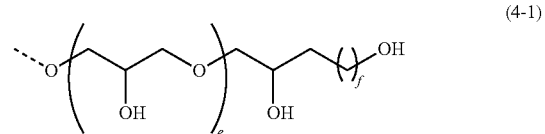

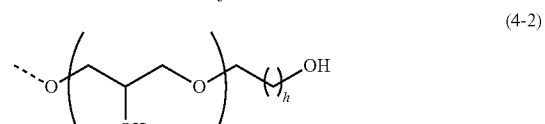

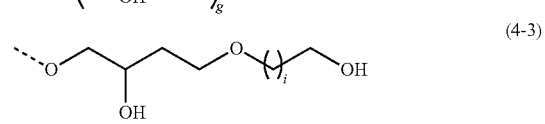

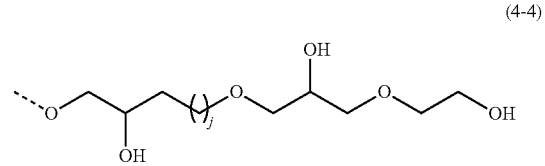

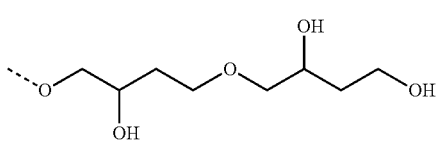
(4-5)

(in Formula (4-1), e is an integer of 0 to 1 and f is an integer of 1 to 4),
(in Formula (4-2), g is an integer of 1 to 2 and h is an integer of 1 to 3),
(in Formula (4-3), i is an integer of 1 to 3), and
(in Formula (4-4), j is an integer of 1 to 2).

5. The fluorine-containing ether compound according to claim 1,
wherein $R^2$, $R^4$, and $R^6$ in Formula (1) above are each independently any of Formulae (5) to (9) below,

 (5)

(in Formula (5), k and l indicate the average degree of polymerization and each independently represent 0.1 to 20),

 (6)

(in Formula (6), m indicates the average degree of polymerization and represents 0.1 to 20),

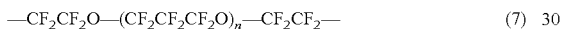 (7)

(in Formula (7), n indicates the average degree of polymerization and represents 0.1 to 20,

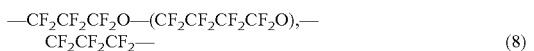 (8)

(in Formula (8), o indicates the average degree of polymerization and represents 0.1 to 10, and

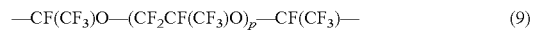 (9)

(in Formula (9), p indicates the average degree of polymerization and represents 0.1 to 20).

6. The fluorine-containing ether compound according to claim 1,
wherein $R^1$ and $R^7$ in Formula (1) above are the same as each other.

7. The fluorine-containing ether compound according to claim 1,
wherein $R^2$ and $R^6$ in Formula (1) above are the same as each other.

8. The fluorine-containing ether compound according to claim 1,
wherein a number average molecular weight thereof is within a range of 500 to 10,000.

9. A lubricant for a magnetic recording medium comprising:
the fluorine-containing ether compound according to claim 1.

10. A magnetic recording medium,
wherein at least a magnetic layer, a protective layer, and a lubricating layer are sequentially provided on a substrate, and
wherein the lubricating layer contains the fluorine-containing ether compound according to claim 1.

11. The magnetic recording medium according to claim 10,
wherein an average film thickness of the lubricating layer is 0.5 nm to 2.0 nm.

12. The fluorine-containing ether compound according to claim 1, wherein $R^1$ and $R^7$ are different from each other.

13. The fluorine-containing ether compound according to claim 1, wherein $R^2$ and $R^6$ are different from each other.

* * * * *